United States Patent
Nguyen et al.

(10) Patent No.: US 6,417,249 B1
(45) Date of Patent: Jul. 9, 2002

(54) INK-JET PRINTING INK COMPOSITIONS HAVING SUPERIOR SMEAR-FASTNESS

(75) Inventors: Khe C. Nguyen; Sivapackia Ganapathiappan, both of Los Altos, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/138,772

(22) Filed: Aug. 24, 1998

Related U.S. Application Data

(63) Continuation-in-part of application No. 08/962,496, filed on Oct. 31, 1997, now abandoned.

(51) Int. Cl.$^7$ .............................................. C08L 83/00
(52) U.S. Cl. ...................................... 523/201; 524/247
(58) Field of Search ............................ 524/247; 523/201

(56) References Cited

U.S. PATENT DOCUMENTS

| | | | |
|---|---|---|---|
| 4,565,764 A | 1/1986 | Nakahara et al. ............ | 430/111 |
| 4,680,332 A | * 7/1987 | Hair et al. .................. | 524/377 |
| 4,829,101 A | 5/1989 | Kraemer et al. ............ | 523/201 |
| 4,876,313 A | 10/1989 | Lorah | |
| 5,160,372 A | 11/1992 | Matrick | |
| 5,461,125 A | 10/1995 | Lu et al. ..................... | 525/293 |
| 5,491,209 A | 2/1996 | Helmer et al. | |
| 5,536,812 A | 7/1996 | Yamaguchi et al. ........ | 430/137 |
| 5,607,999 A | 3/1997 | Shimizu et al. ............. | 524/503 |
| 5,616,644 A | 4/1997 | Schlarb et al. .............. | 524/522 |
| 5,912,280 A | 6/1999 | Anton et al. ................ | 523/161 |

FOREIGN PATENT DOCUMENTS

| | | |
|---|---|---|
| EP | 0068903 | 5/1983 |
| EP | 0796901 | 9/1997 |
| JP | 03160069 | 7/1991 |
| JP | XP-002093457 | 11/1993 |

* cited by examiner

Primary Examiner—Bernard Lipman

(57) ABSTRACT

Specific core-shell binders and additives for use in ink-jet printing ink compositions are provided. One class of specific core/shell binders has the general formula $[A_m B_n C'_p]_x$, where A and B are hydrophobic components in which A exhibits a glass transition temperature $T_g$ between about −150° and +25° C. and B exhibits a glass transition temperature greater than 25° C., C' is a component that forms a hydrophilic or water-soluble component in the polymer chain, and has an ionic or non-ionic structure, m<30 wt %, n>40 wt %, and p<30 wt %, with the total of m+n+p=100 wt %, and x=1 to 100,000. The molecular weight (weight average) of the polymer is between about 1,000 and 2,000,000. The polymers useful in the practice of the invention are prepared by emulsifying the monomers and then conducting a free-radical polymerization in water. The foregoing binder polymer is used in conjunction with additives comprising either (a) amine alcohols having the general formula

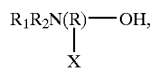

where $R_1$ and $R_2$ are independently selected from the group consisting of hydrogen, alkyl, alkoxy, aryl, and phenoxy, R is alkyl, X is selected from the group consisting of hydrogen, alkyl, aryl, —OH, —COOH, —CHO, and substituted groups or (b) organic acids (water-soluble or water-dispersive), including polymeric acids. Other additives include amines, polyalcohols, polyamines, and polyesters. In the ink compositions of the present invention, the ratio of binder (1) to colorant (pigment) is greater than 1 to 10. The concentration of the additive is within the range of 0.005 to 50 wt %. The general ink formulation comprises: 5 to 50 wt % water-miscible solvent; 0.5 to 10 wt % colorant; 0.005 to 50 wt % additive; and water.

44 Claims, 1 Drawing Sheet

INK-JET PRINTING INK COMPOSITIONS HAVING SUPERIOR SMEAR-FASTNESS

CROSS-REFERENCE TO RELATED APPLICATION

The present application is a continuation-in-part of application Ser. No. 08/962,496, filed Oct. 31, 1997, now abandoned. That application is directed to core/shell polymers in general for use in a variety of applications, including ink-jet printing inks. The present application is directed to a specific class of such core/shell polymers for use in ink-jet printing inks.

TECHNICAL FIELD

The present invention relates generally to ink-jet printing ink compositions having superior smearfastness, as compared to prior art ink-jet ink printing compositions, and, more particularly, to the use of core/shell and other polymers, or binders, with hydrophobic and hydrophilic portions that contribute to such superior smearfastness and additives to the inks that improve their print reliability.

BACKGROUND ART

Core/shell polymers are well-known; such polymers typically have a hydrophilic portion and a hydrophobic portion comprising a latex particle morphology consisting of an inner "core", surrounded by an outer "shell". Core/shell polymers are commonly used to disperse molecules or particles, such as pigments, which are ordinarily insoluble in water, but which, after association with the core/shell polymer, form stable dispersions in water. Dispersion occurs when the hydrophobic portion of the polymer associates with the water-insoluble molecule or particle, and the hydrophilic portion of the polymer disperses with water.

U.S. Pat. No. 4,597,794 discloses the dispersion of pigments in an aqueous vehicle, using aqueous binders comprising both hydrophilic and hydrophobic components. The dispersion of the pigment is followed by centrifugation to eliminate the nondispersed components such as agglomerates. Examples of the hydrophilic component comprise polymers of monomers having a mainly additively polymerizable vinyl group, into which hydrophilic construction portions such as carboxylic acid groups, sulfonic acid groups, sulfate groups, etc. are introduced by using a predetermined amount of an α,β-unsaturated monomer such as acrylic acid, methacrylic acid, crotonic acid, itaconic acid, itaconic acid monoester, maleic acid, maleic acid monoester, fumaric acid, fumaric acid monoester, vinyl sulfonic acid, sulfoethyl methacrylate, sulfopropyl methacrylate, sulfonated vinylnaphthalene, etc. Examples of the hydrophobic portion comprise polymers of monomers selected from the group consisting of styrene, styrene derivatives, vinylnaphthalene, vinylnaphthalene derivatives, and α,β-ethylenic unsaturated carboxylate of aliphatic alcohol having $C_8$–$C_{18}$. In addition to the foregoing monomers, also included are acrylonitrile, vinylidene chloride, α,β-ethylenic unsaturated carboxylate, vinyl acetate, vinyl chloride, acrylamide, methacrylamide, hydroxyethyl methacrylate, hydroxypropyl methacrylate, glycidyl methacrylate, N-methylol acrylamide, N-butoxymethyl acrylamide, etc.

U.S. Pat. No. 5,082,757 discloses encapsulated toner compositions comprising a core and a hydroxylated polyurethane microcapsule shell derived from the polycondensation of a polyisocyanate and a water soluble carbohydrate. The core comprises a polymer binder, pigment, dye, or mixtures thereof. Examples of the polymer binder include polymerized monomers selected from the group consisting of acrylates, methacrylates, and olefins including styrene and its derivatives.

U.S. Pat. No. 5,461,125 discloses waterborne core-shell latex polymers useful as adhesive films, rather than super-dispersion stability. The core comprises a (co)polymer comprising a (meth)acrylate ester, while the shell comprises a copolymer, the copolymer comprising (1) a nitrogen-bearing ethylenically-unsaturated free-radically polymerizable monomer, (2) at least one (meth)acrylate ester of about a $C_1$ to $C_{14}$ alcohol, and (3) an optional ethylenically-unsaturated free-radically polymerizable silane monomer, wherein the nitrogen-bearing ethylenically-unsaturated free-radically polymerizable monomer comprises about 15 to 60 wt % of the shell and wherein the core comprises about 40 to 85 wt % of the weight of the total core-shell latex particle. The polymers obtained by practicing the teachings of the disclosure have molecular weights of 400,000 or more, and the total low $T_g$ component (less than $-10°$ C.), where $T_g$ is the glass transition temperature, is greater than 60 wt %.

U.S. Pat. No. 5,656,071 discloses ink compositions useful for ink-jet applications. These compositions include an insoluble pigment and a polymeric dispersant. In one embodiment, the polymeric dispersant comprises block or graft copolymers comprising a hydrophilic polymeric segment (particularly an acrylate or methacrylate copolymer) and a hydrophobic polymeric segment which includes a hydrolytically stable siloxyl substituent.

Heretofore, ink-jet printers have not had printing performance and durable print properties of competitive printer technologies. The foregoing cited patents do not provide for useful, durable film-forming properties upon removal of the water or solvent. Film durability includes wet and dry rub resistance, highlighter smearfastness, lightfastness, and waterfastness (e.g., hot and cold water, under spill, soak, and rub conditions).

In particular, formulating an ink-jet ink often involves compromising competing interests. For example, it is possible to enhance one property, such as durable film-forming of the colorant. However, such enhancement usually results in the degradation of another property, such as printing stability associated in thermal ink-jet with resistor fouling or nozzle clogging (kogation or decap—nozzle crusting).

Many thermal ink-jet inks exhibit poor smearfastness due to the aqueous solubility of the colorant and/or the dispersibility of the colorant. Efforts continue to develop ink-jet printing ink compositions that evidence the level of smearfastness that a water-insoluble colorant, such as a pigment, possesses, while retaining other desirable printing characteristics.

DISCLOSURE OF INVENTION

In accordance with the invention, specific core-shell binders and certain additives for use in ink-jet printing ink compositions are provided. The specific core/shell binders have the general formula (I)

$$[(A)_m(B)_n(C)_p(D)_q(E)_r]_k \qquad (I)$$

wherein A, B, C, D, and E represent functionalities as follows:

A=at least one hydrophobic component contributing to improved durable, film-forming properties selected from moieties which, when homopolymerized to a solid state, have a glass transition temperature ($T_g$) in the range between $-150°$ and $+25°$ C.;

B=at least one hydrophobic and solvent barrier moiety used to adjust the $T_g$ of the hydrophobic component of the polymer (I) which, when homopolymerized to a solid state, has a $T_g$ greater than +25° C.;

C=at least one hydrophilic component, selected from a wide variety of water-soluble monomers (optional);

D=at least one UV absorber (optional);

E=a moiety having at least one highly polar functional group (optional);

m=10 to 30 wt %;

n=40 to 90 wt %;

p=0 to 30 wt %;

q=0 to 50 wt %;

r=0 to 40 wt %;

m+n+p+q+r=100 wt %; and x=1 to 100,000, with the proviso that at least one of C and E must be present.

The molecular weight (weight average) of polymer (I) is between about 1,000 and 2,000,000.

The polymers useful in the practice of the invention are prepared by emulsifying the monomers and then conducting a free-radical polymerization in water.

The additives employed in the practice of the present invention include water-soluble or water-dispersive amines, polyamines, polyalcohols, amine alcohols, polyesters, and organic acids.

In the present invention, (a) water-soluble and/or water-dispersive amines and polyamines are found to be good stabilizers for anionic dispersive components, including emulsion polymers (primer, durable polymer, etc.), colorants (pigments, dyes, etc.); and (b) water-soluble and/or water-dispersive acids and polymeric acids are found to be good stabilizers for cationic dispersive components, including emulsion polymers (primer, durable polymer, etc.), colorants (pigments, dyes, etc.).

It has also been found in the present invention, (c) in the case of inks employing anionic dispersive components (colorants, emulsion polymers, etc.), a combination of a suitable quantity of polymeric acid with a suitable amount of amines can further improve the print performance; and (d) in the case of inks employing cationic dispersive components (colorants, emulsion polymers, etc.), a combination of a suitable quantity of polyamines with a suitable amount of acids can further improve the print performance.

It has further been found in the present invention, (e) the non-ionic water-soluble or water-dispersive polyalcohols and polyesters can improve the print performance of the ink comprising either cationic, anionic, and non-ionic dispersive components (colorants, emulsion polymers, etc.).

The amine alcohols have the general formula (II)

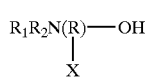
(II)

where $R_1$ and $R_2$ are independently selected from the group consisting of hydrogen, alkyl, alkoxy, aryl, and phenoxy, R is alkyl, and X is selected from the group consisting of hydrogen, alkyl, aryl, —OH, —COOH, and —CHO.

Alternatively, organic acids, whether water-soluble or water-insoluble, are employed in conjunction with the binder polymer in formulating the smear-fast inks of the present invention. The organic acids include polymeric acids as a sub-class.

The ink formulation of the present invention comprises:

5 to 50 wt % water-miscible solvent;

0.5 to 10 wt % colorant;

0.1 to 10 wt % core/shell polymeric binder;

0.005 to 50 wt % additive; and water.

BRIEF DESCRIPTION OF THE DRAWINGS

The sole FIGURE is a schematic diagram of the film-forming, water-dispersive polymer used in the practice of the present invention.

BEST MODES FOR CARRYING OUT THE INVENTION

Definitions

Figure 1A:
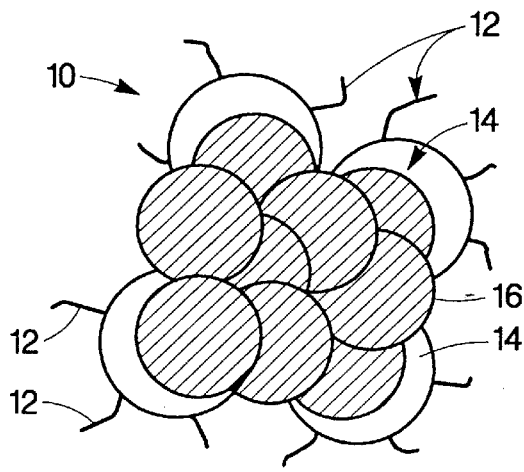
Figure 1B:
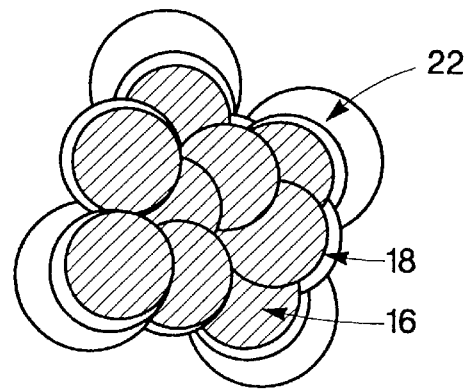
Figure 1C:
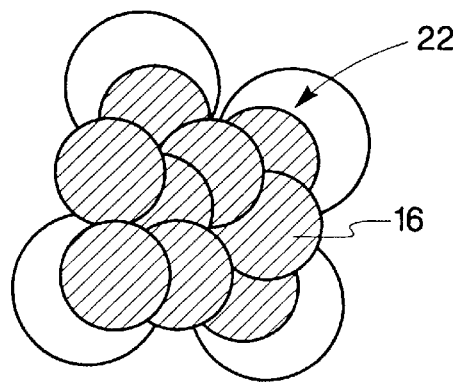
Figure 1D:
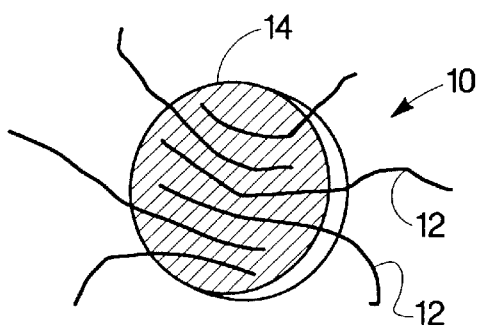

The following definitions are made:

The term "core/shell polymer" means a water-dispersive polymer comprised of a solid hydrophobic core surrounded by (either physically or chemically) a water-soluble shell component, or similar polymers of undefined morphology containing a mixture of hydrophobic and hydrophilic groups.

The term "substituted" is meant to include alcohols (OH), esters (COOR), aldehydes (CHO), carboxylic acids (COOH), thiols (SH), amino groups ($NH_2$, NHR, $NR_2$) nitro group ($NO_2$), nitrites (CN), isocyanides (NC), cyanates (CNO), isocyanates (NCO), amido groups, epoxies, halogens, siloxanes, and pyrridinyls. The term "halogen" is meant to include fluorine, chlorine, bromine, and iodine.

All concentrations are given in terms of weight percent (wt %), unless otherwise specified. All values of molecular weight of polymers are given in terms of weight average.

Monomeric Moieties

In accordance with the present invention, core-shell binders have the following general structure given by formula (I)

wherein A, B, C, D, and E represent functionalities as follows:

A=at least one hydrophobic component contributing to improved durable, film-forming properties selected from moieties which, when homopolymerized to a solid state, have a glass transition temperature ($T_g$) in the range between −150° and +25° C., preferably −100° to +10° C., more preferably from −60° to +0° C.;

B=at least one hydrophobic and solvent barrier moiety used to adjust the $T_g$ of the hydrophobic component of the polymer (I) which, when homopolymerized to a solid state, has a $T_g$ greater than +25° C.;

C=at least one hydrophilic component, selected from a wide variety of water-soluble monomers (optional);

D=at least one UV absorber (optional);

E=a moiety having at least one highly polar functional group (optional);

m=10 to 30 wt %;

n=40 to 90 wt %;

p=0 to 30 wt %;
q=0 to 50 wt %;
r=0 to 40 wt %;
m+n+p+q+r=100 wt %; and
x=1 to 100,000,
with the proviso that at least one of C and E must be present.

Preferably, the core/shell polymer has the structure given by formula (I')

$$A_xB_yC'_z \qquad (I)$$

where A and B, are as defined above, C' is either C or E or both C and E, x>40 wt %, y<30 wt %, and z<30 wt %.

The molecular weight (weight average) of polymer (I) or (I') is between about 1,000 and 2,000,000, preferably between about 5,000 and 500,000, and most preferably between about 10,000 and 70,000.

Preferably, the final $T_g$ of the polymer(s) (I) or (I') is within the range of about −25° to +110° C., and more preferably, the final $T_g$ is within the range of about +250 to +75° C.

The molecular weight (weight average) of polymer (I) is between about 1,000 to 2,000,000, preferably between about 5,000 and 500,000, and most preferably between about 10,000 and 70,000.

The polymer (I) or (I') is designed to have both hydrophobic and hydrophilic moieties. Thus, the polymer is both (1) water-dispersible, and includes water-soluble polar groups, which are present in sufficient quantity to suspend a pigment particle, and (2) hydrophobic, with a substantial fraction of the polymer containing hydrophobic moieties that are either highly water-resistant or even water-insoluble.

The hydrophobic A moiety allows the polymer to have a sufficiently low $T_g$ to permit formation of a film with other polymer molecules containing the A moiety. The film formation results upon drying (removal of water).

The hydrophobic B moiety in combination with the hydrophobic A moiety provides the polymer with resistance to environmental solvents, such as water and those found in highlighter pens. Additional environmental solvents can be found in rain, coffee, soda pop, body oils, soils, hot water, etc.

The hydrophilic C moiety may be provided in the polymer itself, as shown in formula (I). At least one C moiety may be present, and is water-soluble. If present, such water-soluble moieties comprise an ionic or non-ionic shell of the core-shell polymer. Alternatively, the C moiety may be provided by one or more surfactants, to form a polymer/surfactant system. Any of the ionic (anionic and cationic), non-ionic, and zwitterionic (amphoteric) surfactants may be employed. A representative listing of applicable surfactant can be found in McCutcheon's Emulsifiers and Detergents, North American Edition, 1997, McCutcheon's Division, MC Publishing Co. 175 Rock road, Glen Rock, N.J. 07452 USA Examples of surfactants that may be beneficially employed in the practice of the present invention include: TERGITOLs, which are polyethylene or polypropylene oxide ethers; alkyl phenyl polyethylene oxides available under the tradenane TRITONs,; BRIJs, which are polyethylene or polypropylene oxide ethers; PLURONICs, which are also polyethylene/o polypropylene oxide copolymers from BASF; and the SURFYNOLs, which are acetylenic ethoxylated diols; polyethylene oxide (POE) esters; POE diesters; POE amines; protonated POE amines; POE amides; the polypropylene analogs of the foregoing POE compounds; dimethicone copolyols; quaternary ammonium compounds; AEROSOLS, including sulfosuccinates; ethoxylates, amine oxides, and betaines.

Preferred examples of non-ionic surfactants include, but are not limited to, BRIJs, which are polyethylene oxide ethers, available from ICI Surfactants (specific examples include the following BRIJs: 30, 35, 52, 56, 58, 72, 76, 78, 92, 97, and 98); TWEENs, which are derivatives of polyethylene oxides, available from ICI Surfactants (specific examples include the following TWEENs: 20, 40, 60, 80, and 85); SOLSPERSE 27,000, which is an aromatic ethoxylate, available from Zeneca; SPAN 85, which is available from Air Products; and SURFYNOLs, which are acetylenic ethylene oxides available from Air Products. Examples of anionic surfactants include AEROSOL DPOS 45, which is a sulfate, available from Cytec Industries; sodium octadecyl sulfonate; dioctyl ester of sodium sulfosuccinic acid; AEROSOL TO 100%, which is a sulfate, available from American Cyanamid; and sodium lauryl sulfonate. If used, the amount of surfactant ranges from about 0.001 to 30 wt %, and the balance the polymer.

Optionally, one or more UV absorber moieties D may be present. The UV absorber contains a UV blocking chromophore, which imparts lightfastness to the polymer.

Also optionally, one or more ionic water-soluble, dispersible moieties E may be present. If present, such water-soluble moieties comprise an ionic shell of the core-shell polymer.

Although the C and E moieties are indicated as being optional, at least one of these two moieties must be present in the polymer.

One moiety (monomer) may be employed to provide one or more of the foregoing functions. Alternatively, one function may be provided by one or more of the foregoing moieties. However, in many instances, a single moiety provides a single function.

Typically, the polymer(s) of the present invention is prepared by emulsifying the monomeric components, and then conducting a free-radical polymerization in water. Free-radical polymerization involves employing a free-radical initiator. A concentration of about 0.001 to 10 wt % of the initiator is employed in the total monomer system. Examples of suitable free-radical initiators include, but are not limited to, ammonium persulfate, potassium persulfate, hydrogen peroxide, benzoyl peroxide, azobisisobutyronitrile, TRIGONOX 21, and PERKADOX 16. Preferably, the resulting polymer (I) is a random polymer.

Two or more moieties (monomers) may be copolymerized. Alternatively, two or more polymers may be blended together.

One skilled in this art would understand that the polymer(s) can also be prepared by conventional condensation techniques. Once a film is formed from the polymer and water is removed, as by dehydration under ambient conditions, the film is essentially impervious to water, and the polymer is not capable of being redispersed with water. If the polymer or polymer/surfactant system is associated with pigment particles, and the pigment with polymer or polymer/surfactant system is deposited on a surface, such as paper, then the pigment particles are trapped within or beneath the film on the surface, and are thus protected from the effects of water and environmental solvents.

The sole FIGURE illustrates a molecule of polymer (I). Moieties A and B form a solid core. The C moiety forms a non-ionic, water-soluble shell. The D moiety is a UV absorber. The E moiety forms an ionic, water-soluble or water-insoluble shell.

As stated above, the A moiety is a hydrophobic component for controlling solubility in organic solvents selected from monomer(s) that form homopolymers having a $T_g$ in the range between −150° and +25° C. The A moiety is preferably selected from ethylenically-substituted compounds given by (A):

$$C(R_1)(R_2)=C(R_3)R_4R_5R_6 \qquad (A)$$

where $R_1$ and $R_2$ are independently hydrogen, halogen, alkyl, aryl, or substituted alkyl or aryl, or vinyl butyral, $R_3$ is hydrogen, halogen, saturated or unsaturated alkyl, alkoxy, aryl, or substituted alkyl, alkoxy, or aryl, $R_4$ is direct bond, O, CO, NH, halogen, saturated or unsaturated alkyl, aryl, or substituted alkyl, aryl, or CN, $R_5$ is absent (if $R_4$ is alkyl, aryl, or substituted alkyl or aryl), direct bond, hydrogen, NH, O, alkyl, alkylene, aryl, or substituted alkyl, alkylene, or aryl, and $R_6$ is absent (if $R_4$ is alkyl, aryl, or substituted alkyl or aryl or if $R_5$ is hydrogen, alkyl, aryl, or substituted alkyl or aryl), $NH_2$, saturated or unsaturated alkyl, alkoxy, aryl, aroxy, or substituted alkyl, or aryl. The alkyl, alkoxy, alkylene, and aryl chains each contain more than one carbon atom and less than 40 carbon atoms. Preferably, the $R_4$ functionality is an electron acceptor moiety.

One preferred embodiment of formula (A) is the following general structure (A1):

where $R'_3$=H, halogen, alkyl, aryl or substituted alkyl or aryl;

$R'_5$=direct bond, O, or NH; and $R'_6$=alkyl, substituted alkyl, alkylaryl or substituted alkylaryl and aralkyl in which the length of alkyl, alkylaryl or aralkyl chain is given as the number of C atoms between 2 and 40; and alkyl or aryl siloxanes.

Examples for structure (A1) include, but are not limited to:

(A1-1) ethyl acrylate;
(A1-2) ethyl methacrylate;
(A1-3) benzyl acrylate;
(A1-4) benzyl methacrylate;
(A1-5) propyl acrylate;
(A1-6) propyl methacrylate;
(A1-7) iso-propyl acrylate;
(A1-8) iso-propyl methacrylate;
(A1-9) butyl acrylate;
(A1-10) butyl methacrylate;
(A1-11) hexyl acrylate;
(A1-12) hexyl methacrylate;
(A1-13) octadecyl methacrylate;
(A1-14) octadecyl acrylate;
(A1-15) lauryl methacrylate;
(A1-16) lauryl acrylate;
(A1-17) hydroxyethyl acrylate;
(A1-18) hydroxyethyl methacrylate;
(A1-19) hydroxyhexyl acrylate;
(A1-20) hydroxyhexyl methacrylate;
(A1-21) hydroxyoctadecyl acrylate;
(A1-22) hydroxyoctadecyl methacrylate;
(A1-23) hydroxylauryl methacrylate;
(A1-24) hydroxylauryl acrylate;
(A1-25) phenethyl acrylate;
(A1-26) phenethyl methacrylate;
(A1-27) 6-phenylhexyl acrylate;
(A1-28) 6-phenylhexyl methacrylate;
(A1-29) phenyllauryl acrylate;
(A1-30) phenyllauryl methacrylate;
(A1-31) 3-nitrophenyl-6-hexyl methacrylate;
(A1-32) 3-nitrophenyl-18-octadecyl acrylate;
(A1-33) ethyleneglycol dicyclopentyl ether acrylate;
(A1-34) vinyl ethyl ketone;
(A1-35) vinyl propyl ketone;
(A1-36) vinyl hexyl ketone;
(A1-37) vinyl octyl ketone;
(A1-38) vinyl butyl ketone;
(A1-39) cyclohexyl acrylate;
(A1-40) 3-methacryloxypropyldimethylmethoxysilane;
(A1-41) 3-methacryloxypropylmethyldimethoxysilane;
(A1-42) 3-methacryloxypropylpentamethyldisiloxane;
(A1-43) 3-methacryloxypropyltris(trimethylsiloxy) silane;
(A1-44) 3-acryloxypropyldimethylmethoxysilane;
(A1-45) acryloxypropylmethyldimethoxysilane;
(A1-46) trifluoromethyl styrene;
(A1-47) trifluoromethyl acrylate;
(A1-48) trifluoromethyl methacrylate;
(A1-49) tetrafluoropropyl acrylate;
(A1-50) tetrafluoropropyl methacrylate;
(A1-51) heptafluorobutyl methacrylate;
(A1-52) iso-butyl acrylate;
(A1-53) iso-butyl methacrylate;
(A1-54) 2-ethylhexyl acrylate;
(A1-55) 2-ethylhexyl methacrylate;
(A1-56) iso-octyl acrylate; and
(A1-57) iso-octyl methacrylate.

Another preferred embodiment for formula (A) is the following general structure (A2):

where $R'_3$=same definition as that of structure (A1) above; and $R_7=R_8$=same or different combinations of $R'_6$ in structure (A1) above.

An example for structure (A2) includes, but is not limited to:

(A2-1) N,N-dihexyl acrylamide; and
(A2-2) N,N-dioctyl acrylamide.

Yet another preferred embodiment for formula (A) is the following general structure (A3):

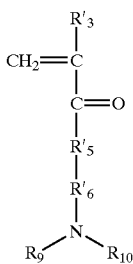
(A3)

where R'$_3$=same definition as that of structure (A1);
R'$_5$=same definition as that of structure (Al);
R'$_6$=alkylene, arylene, substituted alkylene or arylene; and
R$_9$ and R$_{10}$ are independently selected from H, alkyl, substituted alkyl, alkylaryl or substituted alkylaryl in which the length of alkyl and alkylaryl chains each comprise between 2 and 40 C atoms. Alternatively, R$_9$ and R$_{10}$ together may form a 5- or 6-membered ring.

Examples for structure (A3) include, but are not limited to:
(A3-1) aminoethyl acrylate;
(A3-2) aminopropyl acrylate;
(A3-3) aminopropyl methacrylare;
(A3-4) aminoisopropyl acrylate;
(A3-5) aminoisopropyl methacrylate;
(A3-6) aminobutyl acrylate;
(A3-7) aminobutyl methacrylate;
(A3-8) aminohexyl acrylate;
(A3-9) aminohexyl methacrylate;
(A3-10) aminooctadecyl methacrylate;
(A3-11) aminooctadecyl acrylate;
(A3-12) aminolauryl methacrylate;
(A3-13) aminolauryl acrylate;
(A3-14) N,N-dimethylaminoethyl acrylate;
(A3-15) N,N-dimethylaminoethyl methacrylate;
(A3-16) N,N-diethylaminoethyl acrylate;
(A3-17) N,N-diethylaminoethyl methacrylate; and
(A3-18) piperidino-N-ethyl acrylate.

Still another preferred embodiment for formula (A) is the following general structure (A4):

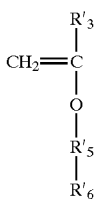
(A4)

where: R'$_4$=H, halogen, alkyl, aryl, sustituted alkyl or aryl;
R'$_5$=direct bond, CO, alkylene, arylene, substituted alkylene or arylene; and
R'$_6$=alkyl, aryl, substituted alkyl or aryl.

Examples for structure (A4) include, but are not limited to:

(A4-1) vinyl propionate;
(A4-2) vinyl acetate;
(A4-3) vinyl butyrate;
(A4-4) vinyl butyl ether; and
(A4-5) vinyl propyl ether.

As stated above, the B moiety is hydrophobic and is a solvent barrier composed of monomer(s) that form homopolymers having a T$_g$ greater than 25° C. The B moiety has the general structure given by formula (B)

$$CR_1R_2=C(R_3)R''_4R''_5R''_6 \quad (B)$$

where R$_1$ and R$_2$ are independently hydrogen, halogen, or vinyl butyral,
R$_3$ is hydrogen, halogen, alkyl, alkoxy, alkylene, aryl, or substituted alkyl, alkoxy, alkylene, or aryl,
R''$_4$ is direct bond, O, CO, N, NO$_2$, halogen, alkyl, alkylene, aryl, or substituted alkyl, alkylene, aryl,
R''$_5$ is hydrogen, N, O, alkyl, alkylene, aryl, or substituted alkyl, alkylene, or aryl, and
R''$_6$ is alkyl, alkoxy, alkylene, aryl, aroxy, or substituted alkyl, alkylene, or aryl. The alkyl, alkoxy, alkylene, aryl, aroxy chains each contain from 1 to 40 carbon atoms. Additionally, R$_1$ and R$_2$ and R$_2$ and R$_3$ can each form a ring; one example of a ring compound so formed includes, but is not limited to, polyvinyl butryal. Further, R''$_4$ and R$_5$ can form a ring through either nitrogen or oxygen.

Formula (B) is seen to be substantially the same as formula (A), but with some differences in the substituent groups, which provide a homopolymer of these monomers with the higher T$_g$ of at least 25° C.

One preferred embodiment of formula (B) is the following general structure (B1):

$$CH_2=CR'''_5R'''_6 \quad (B1)$$

where R'''$_5$=hydrogen, alkyl, alkoxy, aryl or halogen; and
R'''$_6$=H, aryl, alkyl (with one carbon atom), amino, ester, epoxy component containing groups, and fluoroalkyl derivatives.

Examples for formula (B1) include, but are not limited to;
(B1-1) ethylene;
(B1-2) styrene;
(B1-3) vinyl carbazole;
(B1-4) vinyl naphthalalene;
(B1-5) vinyl anthracene;
(B1-6) vinyl pyrene;
(B1-7) methyl methacrylate;
(B1-8) methyl acrylate;
(B1-9) alpha-methyl styrene;
(B1-10) dimethylstyrene;
(B1-11) methylstyrene;
(B1-12) vinylbiphenyl;
(B1-13) glycidyl acrylate;
(B1-14) glycidyl methacrylate;
(B1-5) glycidyl propylene;
(B1-16) 2-methyl-2-vinyl oxirane;
(B1-17) vinyl pyrridine;
(B1-18) aminoethyl methacrylate; and
(B1-19) aminoethylphenyl acrylate.

Another preferred embodiment of formula (3) is the following general structure (B2):

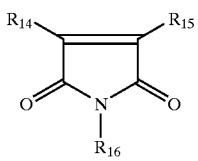

(B2)

where $R_{14}$ and $R_{15}$ are independently selected from H, halogen, alkyl, aryl, substituted alkyl and aryl; alternatively, $R_{14}$ and $R_{15}$ are in the form of a closed ring; and $R_{16}$ is H, halogen, alkyl, aryl, substituted alkyl or aryl, or unsaturated alkyl.

Examples for formula (B2) include, but are not limited to:

(B2-1) maleimide;

(B2-2) N-phenyl maleimide;

(B2-3) N-hexyl maleimide;

(B2-4) N-vinylphthalimide; and (B2-5) N-vinyl maleimide.

As stated above, the C moiety is a hydrophilic component. The C moiety is selected from a wide variety of monomers such as poly(ethylene glycol) units having general formula (C1), vinyl pyrrolidones having general formula (C2), vinyl imidazoles having general formula (C3) and acrylamides having general formula (C4), all of which polymerize to form water-soluble polymers.

The general structure of formula (C1) is

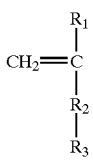

(C1)

where $R_1$=H, halogen, alkyl, aryl, or substituted alkyl or aryl;

$R_2$=direct bond, O, CO, NH, or CONH;

$R_3$=OH, $(CH_2CH_2O)_yR_4$, $(CH_2CH(CH_3)O)_yR_4$, or $(CH_2CH(C_2H_5)O)_yR_4$ or the thioether analogs: SH, $(CH_2CH_2S)_yR_4$, $(CH_2CH(CH_3)S)_yR_4$, or $(CH_2CH(C_2H_5)S)_yR_4$;

y=1 to 200; and $R_4$=alkyl, aryl, substituted alkyl or aryl.

Examples for general structure (C1) include, but are not limited to:

(C1-1) poly(ethylene glycol) methyl ether acrylate of average molecular weight 404;

(C1-2) poly(ethylene glycol) methyl ether methacrylate of average molecular weight 418;

(C1-3) poly(ethylene glycol) methyl ether methacrylate of average molecular weight 2068;

(C1-4) poly(ethylene glycol) methyl ether acrylate of average molecular weight 2054; and (C1-5) polyvinyl alcohol.

The general structure of formula (C2) is

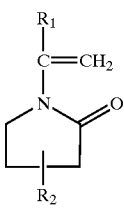

(C2)

where $R_1$ and $R_2$ are independently selected from —H, halogen, alkyl, aryl, and substituted alkyl and aryl.

Examples for general structure (C2) include, but are not limited to:

(C2-1) vinyl pyrrolidone;

(C2-2) vinyl 4-methylpyrrolidone; and (C2-3) vinyl 4-phenylpyrrolidone.

The general structure of formula (C3) is

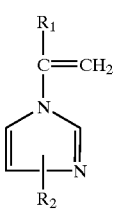

(C3)

where $R_1$ and $R_2$ are independently selected from H, halogen, alkyl, aryl, and substituted alkyl and aryl.

Examples for general structure (C3) include, but are not limited to:

(C3-1) vinyl imidazole;

(C3-2) vinyl 4-methylimidazole; and (C3-3) vinyl 4-phenylimidazole.

The general structure of formula (C4) is

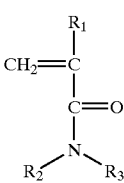

(C4)

where $R_1$ is H, halogen, alkyl, aryl or substituted alkyl or aryl; and $R_2$ and $R_3$ are independently selected from H, alkyl, aryl and substituted alkyl and aryl; alternatively, $R_2$ and $R_3$ can form a ring, either aliphatic or aromatic.

Examples for the general structure (C4) include, but are not limited to:

(C4-1) acrylamide;

(C4-2) methacrylamide;

(C4-3) N,N-dimethyl acrylamide;

(C4-4) N-methyl acrylamide;

(C4-5) N-methyl methacrylamide;

(C4-6) aryloxy piperidine; and (C4-7) N,N-diethyl acrylamide.

As stated above, the D moiety is a UV absorber composed of monomer(s) having the general structure of formula (D)

(11)

$CH_2=C(R^1)-C(=O)-R^2-R^3$ $R^1$ = H, Alkyl, aryl, substituted alkyl or aryl
$R^2$ = O or NH
$R^3$ = —$CH_2CH_2$—

[structures: benzotriazolyl-phenol with $R^1$ substituents; piperidine with $R^1$ substituents; phenol with $R^1$ substituents; hydroxybenzophenone with $R^1$ substituents; diphenyl cyanoacrylate —C(=CPh$_2$)(CN)—C(=O)—O—CH$_2$CH$_2$—; and diphenyl oxamide —NH—C(=O)—C(=O)—NH— with $R^1$ substituents]

As stated above, the E moiety is a highly polar functional group composed of moieties having the general structure given by formulae (E1) to (E10).

The general structure of formula (E1) is $$CH(R_1)=C(R_2)R_3COOH \qquad (E1)$$

where $R_1$=H, COOH, $COOR_4$;

$R_2$=H, halogen, alkyl, aryl, alkoxyl, or substituted alkyl, aryl or alkoxyl;

$R_3$=direct bond, alkylene, arylene or sustituted alkylene or arylene; and $R_4$=alkyl, aryl, substituted alkyl or aryl.

Examples for structure (E1) include, but are not limited to:

(E1-1) acrylic acid;
(E1-2) methacrylic acid;
(E1-3) chloromethacrylic acid;
(E1-4) maleic acid; and
(E1-5) vinylbenzoic acid.

The general structure of formula (E2) is $$CH_2=CHR_1NR_2R_3 \qquad (E2)$$

where $R_1$=alkylene, arylene, substituted alkylene, arylene, or —$SO_2$; and $R_2$ and $R_3$ are independently selected from H, alkyl, aryl, or substituted alkyl, aryl or alkoxyl; alternatively, $R_2$ and $R_3$ can be combined to form a ring, either aliphatic or aromatic.

Examples for structure (E2) include, but are not limited to:

(E2-1) allylamine;
(E2-2) N,N-diethylallylamine; and
(E2-3) vinyl sulfonamide.

The general structure of formula (E3) is $$y(CH_2=CHR_1COO^-)M^{y+} \qquad (E3)$$

where $R_1$=alkylene, arylene, substituted alkylene or arylene;

y=1 to 4; and $M^{y+}=NH_4^+$, $Li^+$, $Na^+$, $K^+$, $Ca^{2+}$, $Mg^{2+}$, $Al^{3+}$, $Ti^{4+}$, triethylammonium, diethylammonium, pyrridinium, etc.

Examples for structure (E3) include, but are not limited to:

(E3-1) sodium acrylate;
(E3-2) sodium methacrylate;
(E3-3) ammonium acrylate; and
(E3-4) ammonium methacrylate.

The general structure of formula (E4) is $$z\left(\begin{array}{c} CH_2=CH \\ | \\ R_1 \\ | \\ R_2-N^+-R_4 \\ | \\ R_3 \end{array}\right) X^2 \qquad (E4)$$

where $R_1$=alkylene, arylene, substituted alkylene or arylene, COO, or cyclic ring containing nitrogen;

$R_2$, $R_3$, and $R_4$ are independently selected from H, alkyl, aryl, alkoxyl, or substituted alkyl, aryl or alkoxyl;

z=1 to 4; and

X=halogen, $BF_4$, $PF_6$, $ClO_4$, SCN, CNO, CNS.

Examples for general structure (E4) include, but are not limited to:

(E4-1) acrylamidopropanetriethylammonium chloride;
(E4-2) methacrylamidopropanetriethylammonium chloride; and
(E4-3) vinylpyridine hydrochloride.

The general structure of formula (E5) is $$z \; CH_2=C(R_1)(R_2)-P(=O)(=O)(O^-) \; M^{z+} \qquad (E5)$$

where $R_1$=H, alkyl, aryl, alkoxyl, substituted alkyl, aryl or alkoxyl;

$R_2$=direct bond, alkylene, arylene or substituted alkylene or arylene;

z=1 to 4; and $M^{z+}$=$NH_4^+$, $Li^+$, $Na^+$, $K^+$, $Ca^{2+}$, $Mg^{2+}$, $Al^{3+}$, $Ti^{4+}$, triethylammonium, diethylammonium, pyrridinium, etc.

Examples for the general structure (E5) include, but are not limited to:

(E5-1) sodium vinyl phosphonate; and (E5-2) sodium 1-methylvinylphosphonate.

The general structure of formula (E6) is

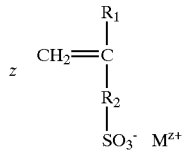
(E6)

where $R_1$=H, alkyl, aryl, alkoxyl, substituted alkyl, aryl or alkoxyl;

$R_2$=direct bond, —$COOR_3$, arylene, alkylene, or —$CONHR_3$;

$R_3$=alkylene, arylene, substituted alkylene or arylene, or fluoroalkylene;

z=1 to 4; and $M^{z+}$=$NH_4^+$, $Li^+$, $Na^+$, $K^+$, $Ca^{2+}$, $Mg^{2+}$, $Al^{3+}$, $Ti^{4+}$, etc.

Examples for the general structure (E6) include, but are not limited to:

(E6-1) sodium vinyl sulfonate;

(E6-2) sodium 1-methylvinylsulfonate;

(E6-3) sodium styrenesulfonate;

(E6-4) sodium acrylamidopropanesulfonate;

(E6-5) sodium methacrylamidopropanesulfonate; and (E6-6) sodium vinyl morpholine sulfonate.

Additional E moieties include the following salts:

(E7) sulfonium salts;

(E8) carbonium salts;

(E9) pyrrilinium salt and thio pyrrilinium salt; and (E10) tetrazolium salt.

The sulfonium salts have the following structure (E7):

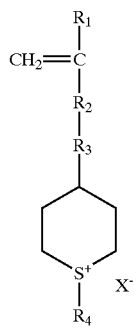
(E7)

where $R_1$=H, halogen, alkyl, or aryl;

$R_2$=CO, O;

$R_3$=direct bond, NH;

$R_4$=alkyl or aryl; and

X=Cl, Br, $BF_4$, $ClO_4$, I, or $NO_3$.

The carbonium salts have the following structure (E8):

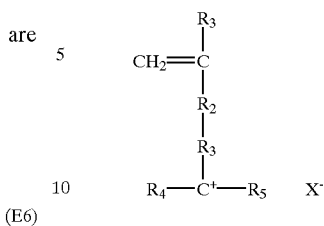
(E8)

where $R_1$=H, halogen, alkyl, or aryl;

$R_2$=CO, O;

$R_3$=direct bond, NH, alkylene, or arylene;

$R_4$ and $R_5$ are independently selected from alkyl or aryl; and

X=$SbF_5^-$, $FSO_3^-$.

The pyrrilinium and thiopyrrilinium salts have the following structure (E9):

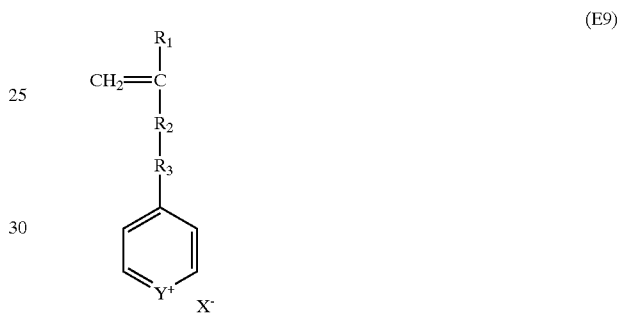
(E9)

where Y=O or S;

$R_1$=H, halogen, alkyl, or aryl;

$R_2$=CO, O;

$R_3$=direct bond, NH, alkylene, or arylene;

X Cl, Br, I, $ClO_4$, $BF_4$, etc.

Polymers

Polymers that fall within the scope of the formula (I) include, but are not limited to, the following examples, which may be characterized as A-B-C or A-B-C-D polymers:

(1) (hexyl acrylate)$_{40}$ (methyl methacrylate)$_{40}$ (poly (ethylene glycol) methyl ether acrylate, mw=404)$_{20}$ (2) (hexyl acrylate)$_{30}$(methyl methacrylate)$_{50}$(poly (ethylene glycol) methyl ether acrylate, mw=404)$_{20}$ (3) (hexyl acrylate)$_{20}$ (methyl methacrylate)$_{60}$ (poly (ethylene glycol) methyl ether acrylate, mw=404)$_{20}$ (4) (hexyl acrylate)$_{40}$(methyl methacrylate)$_{40}$(poly (ethylene glycol) methyl ether acrylate, mw=2054)$_{20}$ (5) (hexyl acrylate)$_{30}$ (methyl methacrylate)$_{50}$ (poly (ethylene glycol) methyl ether acrylate, mw=2054)$_{20}$ (6) (hexyl acrylate)$_{20}$ (methyl methacrylate)$_{60}$ (poly (ethylene glycol) methyl ether acrylate, mw=2054)$_{20}$ (7) (hexyl acrylate)$_{40}$ (methyl methacrylate)$_{40}$ (poly (ethylene glycol) methyl ether acrylate, mw=218)20

(8) (hexyl acrylate)$_{30}$ (methyl methacrylate)$_{50}$ (poly (ethylene glycol) methyl ether acrylate, mw=218)$_{20}$ (9) (hexyl acrylate)$_{20}$ (methyl methacrylate)$_{60}$ (poly (ethylene glycol) methyl ether acrylate, mw=218)$_{20}$

(10) (ethyl acrylate)$_{40}$(methyl methacrylate)$_{40}$(poly (ethylene glycol) methyl ether acrylate, mw=404)$_{20}$

(11) (propyl acrylate)$_{40}$ (methyl methacrylate)$_{40}$ (poly(ethylene glycol) methyl ether acrylate, mw=404)$_{20}$
(12) (butyl acrylate)$_{40}$(methyl methacrylate)$_{40}$(poly(ethylene glycol) methyl ether acrylate, mw=404)$_{20}$
(13) (octadecyl acrylate)$_{40}$ (methyl methacrylate)$_{40}$ (poly(ethylene glycol) methyl ether acrylate, mw=404)$_{20}$
(14) (lauryl methacrylate)$_{40}$ (methyl methacrylate)$_{40}$ (poly(ethylene glycol) methyl ether acrylate, mw=404)$_{20}$
(15) (octadecyl methacrylate)$_{40}$ (methyl methacrylate)$_{40}$ (poly(ethylene glycol) methyl ether acrylate, mw=404)$_{20}$
(16) (hydroxyoctadecyl acrylate)$_{40}$ (methyl methacrylate)$_{40}$ (poly(ethylene glycol) methyl ether acrylate, mw=404)$_{20}$
(17) (hydroxyethyl acrylate)$_{40}$ (methyl methacrylate)$_{40}$ (poly(ethylene glycol) methyl ether acrylate, mw=404)$_{20}$
(18) (hydroxylauryl methacrylate)$_{40}$ (methyl methacrylate)$_{40}$ (poly(ethylene glycol) methyl ether acrylate, mw=404)$_{20}$
(19) (phenethyl acrylate)$_{40}$ (methyl methacrylate)$_{40}$ (poly(ethylene glycol) methyl ether acrylate, mw=404)$_{20}$
(20) (6-phenylhexyl acrylate)$_{40}$ (methyl methacrylate)$_{40}$ (poly(ethylene glycol) methyl ether acrylate, mw=404)$_{20}$
(21) (cyclohexyl acrylate)$_{40}$ (methyl methacrylate)$_{40}$ (poly(ethylene glycol) methyl ether acrylate, mw=404)$_{20}$
(22) (acryloxypropylmethyldimethoxysilane)$_{30}$ (methyl methacrylate)$_{50}$ (poly(ethylene glycol) methyl ether acrylate, mw=404)$_{20}$
(23) (N,N-dihexyl acrylamide)$_{20}$ (methyl methacrylate)$_{60}$ (poly(ethylene glycol) methyl ether acrylate, mw=404)$_{20}$
(24) (aminopropyl acrylate)$_{40}$ (methyl methacrylate)$_{40}$ (poly(ethylene glycol) methyl ether acrylate, mw=2054)$_{20}$
(25) (aminohexyl acrylate)$_{30}$ (methyl methacrylate)$_{50}$ (poly(ethylene glycol) methyl ether acrylate, mw=2054)$_{20}$
(26) (aminolauryl methacrylate)$_{20}$ (methyl methacrylate)$_{60}$ (poly(ethylene glycol) methyl ether acrylate, mw=2054)$_{20}$
(27) (N,N-dimethylaminoethyl acrylate)$_{40}$ (methyl methacrylate)$_{40}$ (poly(ethylene glycol) methyl ether acrylate, mw=218)$_{20}$
(28) (vinyl acetate)$_{30}$ (methyl methacrylate)$_{50}$ (poly(ethylene glycol) methyl ether acrylate, mw=218)$_{20}$
(29) (vinyl butyl ether)$_{20}$ (methyl methacrylate)$_{60}$ (poly(ethylene glycol) methyl ether acrylate, mw=218)$_{20}$
(30) (hexyl acrylate)$_{40}$ (styrene)$_{40}$ (poly(ethylene glycol) methyl ether acrylate, mw=404)$_{20}$
(31) (hexyl acrylate)$_{30}$ (dimethyl styrene)$_{50}$ (poly(ethylene glycol) methyl ether acrylate, mw=404)$_{20}$
(32) (hexyl acrylate)$_{20}$ (trifluoromethyl styrene)$_{60}$ (poly(ethylene glycol) methyl ether acrylate, mw=404)$_{20}$
(33) (hexyl acrylate)$_{40}$ (tetrafluoropropyl methacrylate)$_{40}$ (poly(ethylene glycol) methyl ether acrylate, mw=2054)$_{20}$
(34) (hexyl acrylate)$_{30}$ (glycidyl methacrylate)$_{50}$ (poly(ethylene glycol) methyl ether acrylate, mw=2054)$_{20}$
(35) (hexyl acrylate)$_{20}$ (glycidyl acrylate)$_{60}$ (poly(ethylene glycol) methyl ether acrylate, mw=2054)$_{20}$
(36) (hexyl acrylate)$_{40}$ (maleimide)$_{40}$ (poly(ethylene glycol) methyl ether acrylate, mw=218)$_{20}$
(37) (hexyl acrylate)$_{50}$ (n-hexyl maleimide)$_{30}$ (poly(ethylene glycol) methyl ether acrylate, mw=218)$_{20}$
(38) (hexyl acrylate)$_{40}$ (n-vinyl maleimide)$_{40}$ (poly(ethylene glycol) methyl ether acrylate, mw=218)$_{20}$
(39) (hexyl acrylate)$_{40}$ (methyl methacrylate)$_{40}$ (vinyl pyrrolidone)$_{20}$
(40) (hexyl acrylate)$_{40}$ (methyl methacrylate)$_{40}$ (vinyl 4-methylpyrrolidone)$_{20}$
(41) (hexyl acrylate)$_{40}$ (methyl methacrylate)$_{40}$ (vinyl imidazole)$_{20}$
(42) (hexyl acrylate)$_{40}$ (methyl methacrylate)$_{40}$ (acrylamide)$_{20}$
(43) (hexyl acrylate)$_{40}$ (methyl methacrylate)$_{40}$ (4-methyl acrylamide)$_{20}$
(44) (hexyl acrylate)$_{40}$ (methyl methacrylate)$_{30}$ (poly(ethylene glycol) methyl ether acrylate, mw=404)$_{20}$ (D1)$_{10}$, where, referring to the D moiety, $R^1$=H, $R^2$=O, and $R^3$=D1
(45) (hexyl acrylate)$_{40}$ (methyl methacrylate)$_{30}$ (poly(ethylene glycol) methyl ether acrylate, mw=404)$_{20}$ (D1)$_{10}$, where, referring to the D moiety, $R^1$=H, $R^2$=O, and $R^3$ =D1
(46) (hexyl acrylate)$_{40}$ (methyl methacrylate)$_{30}$ (poly(ethylene glycol) methyl ether acrylate, mw=404)$_{20}$ (D1)$_{10}$, where, referring to the D moiety, $R^1$=H, $R^2$=O, and $R^3$=D1
(47) (hexyl acrylate)$_{40}$ (methyl methacrylate)$_{30}$ (poly(ethylene glycol) methyl ether acrylate, mw=404)$_{20}$ (D1)$_{10}$, where, referring to the D moiety, $R^1$=H, $R^2$=O, and $R^3$=D1
(48) (hexyl acrylate)$_{40}$ (methyl methacrylate)$_{30}$ (poly(ethylene glycol) methyl ether acrylate, mw=404)$_{20}$ (D4)$_{10}$, where, referring to the D moiety, $R^1$=H, $R^2$=O, and $R^3$=D4
(49) (hexyl acrylate)$_{40}$ (methyl methacrylate)$_{30}$ (poly(ethylene glycol) methyl ether acrylate, mw=404)$_{20}$ (D4)$_{10}$, where, referring to the D moiety, $R^1$=H, $R^2$=O, and $R^3$=D4
(50) (hexyl acrylate)$_{40}$ (styrene)$_{30}$ (poly(ethylene glycol) methyl ether acrylate, mw=404)$_{20}$(D1)$_{10}$, where, referring to the D moiety, $R^1$=H, $R^2$=O, and $R^3$=D1
(51) (hexyl acrylate)$_{40}$ (styrene)$_{30}$ (vinyl pyrrolidone)$_{20}$ (D1), where, referring to the D moiety, $R^1$=H, $R^2$=O, and $R^3$=D1
(52) (hexyl acrylate)$_{50}$ (methyl methacrylate)$_{45}$ (poly(ethylene glycol) methyl ether acrylate, mw=404)$_5$
(53) (hexyl acrylate)$_{50}$ (methyl methacrylate)$_{40}$ (poly(ethylene glycol) methyl ether acrylate, mw=404)$_{10}$
(54) (hexyl acrylate)$_{50}$ (methyl methacrylate)$_{35}$ (poly(ethylene glycol) methyl ether acrylate, mw=404)$_{15}$ Polymers that fall within the scope of the formula (I) include, but are not limited to, the following examples, which may be characterized as A-B-E polymers:

(55) (hexyl acrylate)$_{40}$ (methyl methacrylate)$_{40}$ (acrylic acid)$_{20}$
(56) (hexyl acrylate)$_{60}$ (methyl methacrylate)$_{20}$ (methacrylic acid)$_{20}$
(57) (hexyl acrylate)$_{40}$ (methyl methacrylate)$_{40}$ (maleic acid)$_{20}$
(58) (hexyl acrylate)$_{40}$ (methyl methacrylate)$_{40}$ (vinyl benzoic acid)$_{20}$

(59) (hexyl acrylate)$_{40}$ (methyl methacrylate)$_{40}$ (vinyl sulfonamide)$_{20}$

(60) (hexyl acrylate)$_{40}$ (methyl methacrylate)$_{40}$ (sodium acrylate)$_{20}$

(61) (hexyl acrylate)$_{40}$ (methyl methacrylate)$_{40}$ (ammonium acrylate)$_{20}$

(62) (hexyl acrylate)$_{40}$ (methyl methacrylate)$_{40}$ (ammonium methacrylate)$_{20}$

(63) (ethyl acrylate)$_{40}$ (methyl methacrylate)$_{40}$ (acrylamidopropanetriethylammonium chloride)$_{20}$

(64) (propyl acrylate)$_{40}$ (methyl methacrylate)$_{40}$ (vinyl pyridine hydrochloride)$_{20}$

(65) (butyl acrylate)$_{40}$ (methyl methacrylate)$_{40}$ (sodium vinyl phosphate)$_{20}$

(66) (hexyl acrylate)$_{40}$, (methyl methacrylate)$_{40}$ (sodium styrene sulfonate)$_{20}$

(67) (hexyl acrylate)$_{30}$ (methyl methacrylate)$_{50}$ (sodium acrylamidopropanesulfonate)$_{20}$

(68) (butyl acrylate)$_{40}$ (methyl methacrylate)$_{40}$ (sodium vinyl phosphate)$_{20}$

(69) (hexyl acrylate)$_{40}$ (methyl methacrylate)$_{40}$ (sodium styrene sulfonate)$_{20}$

(70) (hexyl acrylate)$_{30}$ (methyl methacrylate)$_{50}$ (sodium acrylamidopropanesulfonate)$_{20}$

(71) (styrene)$_{75}$ (acrylic acid)$_{20}$ (D1)$_5$, where, referring to the D moiety, $R^1$=H, $R^2$=O, and $R^3$=D1

(72) (styrene)$_{55}$ (acrylic acid)$_{40}$ (D4)$_5$, where, referring to the D moiety, R'=H, $R^2$=O, and $R^3$=D4

(73) (styrene)$_{40}$ (methyl methacrylate)$_{40}$ (acrylic acid)$_{20}$

(74) (ethyl acrylate)$_{55}$ (acrylic acid)$_{40}$ (D1)$_5$, where, referring to the D moiety, R'=H, $R^2$=O, and $R^3$=D1

(75) (styrene)$_{40}$ (ethyl acrylate)$_{40}$ (acrylic acid)$_{20}$

(76) (methyl methacrylate)$_{40}$ (hexyl acrylate)$_{55}$ (D1)$_5$, where, referring to the D moiety, $R^1$=H, $R^2$=O, and $R^3$=D1

(77) (methyl methacrylate)$_{40}$ (butyl acrylate)$_{55}$ (D1)$_5$, where, referring to the D moiety, $R^1$=H, $R^2$=O, and $R^3$=D

(78) (styrene)$_{30}$ (octadecyl acrylate)$_{65}$ (D1)$_5$, where, referring to the D moiety, $R^1$=H, $R^2$=O, and $R^3$=D1

(79) (methyl methacrylate)$_{32}$ (hexyl acrylate)$_{46}$ (poly (ethylene glycol) methyl ether acrylate, mw=404)$_{12}$ (acrylic acid)$_{10}$ Inks Any of the commonly employed colorants in ink-jet printing technology may be used in the practice of the present invention. While dyes, whether water-insoluble or water-soluble, may be employed, the core/shell binder is preferably employed with pigments.

Without being limited to theory, it is believed that the primer is associated with the colorant in solution and the primer and durable core/shell polymers are encapsulating the colorants upon drying; this appears to be the case after printing the ink on a print medium, such as paper. However, the present invention is meant to include ink formulations which comprise the polymers and colorants without limit to the type of association between the colorant and the polymer.

The following pigments are useful in the practice of the invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, Monarch® 700, Cabojet200, Cabojet300, IJX55, and IJX76. The following pigments are available from Ciba-Geigy: Chromophtal® Yellow 3G, Chromophtale Yellow GR, Chromophtal® Yellow 8G, Igrazin® Yellow 5GT, Igralite® Rubine 4BL, Monastral® Magenta, MonastralS Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigments are available from Heubach: Dalamar® Yellow YT-858-D and Heucophthal(® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, No- voperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, L75-2577 Yellow, YGD 9374 Yellow, YHD 9123 Yellow, YCD 9296 Yellow, YFD 1100 Yellow, QHD6040 Magenta, QFD1180 Magenta, RFD3217 Magenta, QFD1146 Magenta, RFD9364 Magenta, QFD 9334 Magenta, BCD6105 Cyan, BCD9448 Cyan, BCD6060 Cyan, BFD5002 Cyan, BFD1121 Cyan, and LHD9303 Black.

Dyes, whether water-soluble or water-insoluble, may be employed in the practice of the present invention, although not as preferred as pigments. Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine 0 (Basic Yellow 2), all available from Aldrich Chemical Company. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow.

In the event that one or more surfactants are employed in place of hydrophilic groups on the smear-fast core/shell polymer, the concentration of such surfactant(s) is in the range of about 0.001 to 10 wt %, preferably about 0.01 to 5 wt %, of the ink.

In addition to at least one of the foregoing core/shell polymeric binders, the ink-jet printing inks of the present invention include certain additives, which may be characterized as water-soluble and/or water-dispersive amines, polyamines, polyalcohols, amine alcohols, polyesters, and organic acids, including polymeric acids. Preferably, amine alcohols or organic acids are employed in the practice of the present invention.

The amine alcohols have the general formula (II)

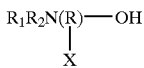
(II)

where $R_1$ and $R_2$ are independently selected from the group consisting of hydrogen, alkyl, alkoxy, aryl, and phenoxy, R is alkyl, and X is selected from the group consisting of hydrogen, alkyl, aryl, —OH, —COOH, and —CHO. Examples of amine alcohols employed as additives include ethanolamine, dimethylaminopropanol, aminobutanol and derivatives thereof, dipropylaminopropane diol, amino propane diol, 2(2-ethyl-ethoxyamino ethanol), dimethylaminobutanol, 2-(diisopropylamino)ethanol, diisopropanolamine, hydroxyquinone, 3-(2-hydroxyethylamino)-5,5-dimethyl-2-cyclohexene-1-one, 3-(1-hydroxyethyl)aniline, 4-morpholineethanol, and 3-morpholino-1,2-propanediol.

In the situation in which polymer (I') is employed, X is preferably hydrogen.

Amines without the alcohol group may also be employed in the practice of the present invention, as well as polyamines.

Examples of water-soluble and/or water-dispersive amines, preferably water-soluble amines, include 1,4-bis(3-aminopropyl) piperazine (Aldrich Cat. #10,943-6), dimethylamine (Aldrich Cat. #38,824-6), 1-methylimidazole (Aldrich Cat. #33,609-2), ethylenediamine (Aldrich Cat. #39,108-5), piperidine (Aldrich Cat. #10,409-4), piperazine (Aldrich Cat. #P4,5907), 1-piperidineethanol (Aldrich Cat. #11,606-8), 2-piperidineethanol (Aldrich Cat. #43,359-4), 3-piperidinemethanol (Aldrich Cat. #15,522-3), and 2-piperidinemethanol (Aldrich Cat. #15,522-5).

An example of a suitable polyamine is oxazoline functional polymer emulsion, available from Nippon Shakubai under the trade designation EPOCROS K1000. Examples of additional polyamines include poly (dimethylamine-co-epichlorohydrin) (A1-drich Cat. #40,911-1), poly (diallyldimethylammonium chloride) (Aldrich Cat. #40, 902-2), poly ethyleneimine (Aldrich Cat. #40,871-9), poly ethyleneimine (Aldrich Cat. #40,870-0), poly ethyleneimine (Aldrich Cat. #40,872-7), poly ethyleneimine (Aldrich Cat. #18,197-8), poly ethyleneimine ethoxylated (Aldrich Cat. #30,618-5 & 42347-5), Jeffamines (emulsion polyamines available from Zeneca), and poly dimethylaminoacrylate (Poly Science).

Examples of poly alcohols include ethylene glycol, polyethylene glycol, propylene glycol, polypropylene glycol, butylene glycol, butanediol (normal and branched), hexane diol (normal and branched), poly(vinyl alcohol), polyethylene glycol methyl ether, polypropylene glycol methyl ether, polypropylene glycol butyl ether, and BYK-375 (a reactive siloxane surface additive containing hydroxy groups, available from BYK Chemie).

Alkaline compounds, including KOH, NaOH, $NH_4OH$, MeONa, etc., are used to adjust pH to the desired range, which is about 6.0 to 9.5, and preferably from about 6.5 to 8.5.

The organic acids may be either water-soluble or water-dispersive but soluble in one or more low vapor pressure solvents employed as part of the vehicle. Such low vapor pressure solvents are described in greater detail below. Examples of water-soluble organic acids employed as additives include citric acid, succinic acid, sulfosuccinic acid, p-toluene sulfonic acid, xylene sulfonic acid, and the like.

As a sub-class of organic acids, polymeric acids are also useful in the practice of the present invention. Examples of such polymeric acids include:
(a) poly acrylic acid and its copolymers ("copo") such as
  (1) copo (styrene/acrylic acid),
  (2) copo (ethyl acrylate/acrylic acid),
  (3) copo (ethylene/vinylacetate/acrylic acid),
  (4) copo (MMA/H EGAc/acrylic acid),
  (5) copo (styrene/MMA/acrylic acid),
  (6) copo (styrene/MMA/PEGAc/acrylic acid);
(b) poly methacrylic acid and its copolymers such as
  (1) copo (styrene/methacrylic acid),
  (2) copo (ethyl acrylate/methacrylic acid),
  (3) copo (ethylene/vinylacetate/methacrylic acid),
  (4) copo (MMA/HA/EGAc/methacylic acid),
  (5) copo (benzylmethacrylate/triethyleneglycol/methacrylic acid),
  (6) copo (styrene MMA/methacrylic acid),
  (7) copo (styrene/MMA/PEGAc/methacrylic acid); and
(c) poly vinylbenzoic acid (PVBA) and its copolymers such as
  (1) copo (MMA/HA/vinyl benzoic acid),
  (2) copo (MMA/HA/PEGAc/vinyl benzoic acid), and
  (3) copo (MMA/EA/PEGAc/vinyl benzoic acid).

The polymeric acids employed in the practice of the invention can be prepared by an interfacial polymerization process or simply by a bulk polymerization process. Thus, these polymeric acids can be in a water-dispersive form or can be a homogeneous solution of suitable solvents.

Many polymeric acids are commercially available. For example, polyacrylic acid derivatives, made by bulk polymerization, are available from BYK Chemie Co., under the trade designations Disperbyk 110, 111, 180, 181, 182, 183, 184, and 190 and BYK 380 and 381. Additional polymeric acids are available from Zeneca Co. under the trade designations Neocryl BT175, BT520, TX-k 14, A6037, XK12, K990, and BT44.

Water-soluble and water-dispersive polyesters are given by the general formulae

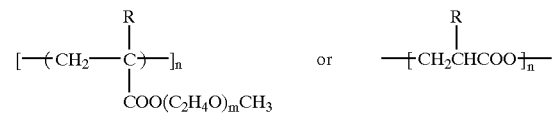

where m=1–300;
n=10 to 10,000;
R=H or alkyl.

Examples of water-soluble and/or water-dispersive polyesters include ethylene glycol diacetate, butylene glycol diacetate, dimethyl succinate, diethyl succinate, poly(vinyl acetate), polyethylene glycol acrylate, polyethylene glycol methacrylate, polpropylene glycol acrylate, polypropylene glycol methacrylate, and polyphenylene glycol methacrylate.

The above-described additives serve to stabilize the aqueous emulsion of the colorant/core-shell binder system, and minimizes decel and kogation in the ink. The foregoing additives may be employed in other ink systems in which water-insoluble colorants, such as pigments and water-insoluble dyes, are employed. In such other ink systems, the additives serve to stabilize the colorants or polymeric particles in the ink formulation, or core/shell binders, in addition to minimizing decel and kogation in the ink. The concentration of the additive is within the range of about 0.005 to 50 wt % of the ink composition.

In the ink compositions of the present invention, the ratio of colorant (pigment) to binder (1) is between 10:1 and 1:10, preferably between 5:1 and 1:5, and most preferably between 3:1 and 1:3.

The general ink formulation comprises:
5 to 50 wt % water-miscible solvent;
0.5 to 10 wt % colorant;
0.1 to 10 wt % at least one core/shell polymeric binder;
0.005 to 50 wt % additive; and
water.

The inks of the present invention comprise about 5 to 50 wt %, preferably about 10 to 25 wt %, water-miscible organic co-solvent, about 0.05 to 10 wt %, preferably about 0.5 to 10 wt %, colorant, about 0.0005 to 50 wt %, preferably about 0.1 to 10 wt %, more preferably about 0.5 to 5 wt %, durable core/shell polymer, about 0.0005 to 50 wt %, preferably about 0.1 to 10 wt %, more preferably about 0.5 to 5 wt %, primer core/shell polymer, about 0.005 to 50 wt % additive, and water.

The co-solvents comprise one or more organic, water-miscible solvents commonly employed in ink-jet printing. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,2(o-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, 1,2-alkyldiols, propylene glycol, glycerol, hexanediol, and heptanediol.

The balance of the ink is water, together with other additives commonly added to ink-jet inks, which are employed to optimize the properties of the ink for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The additives of the present invention may also be used with dual core/shell polymers, such as those disclosed in co-pending applications Ser. No. 08/998,164, filed Dec. 24, 1997 U.S. Pat. No. 5,990,202 and Ser. No. 09/120,270 filed Jul. 21, 1998 U.S. Pat. No. 6,057,384. The additives of the present invention further increase the printability of the ink, resulting in an increase in smear-fastness and water-fastness, apparently due to the protection of the colorant provided by the polymer (primer and/or durable). Further, these additives reduce the dry time of the ink and provide a higher print density and reduced decel and kogation.

It should be noted that the use of the additives disclosed herein without the polymer (1) or (1') do not provide inks with good ink permanence, including water-fastness and smear-fastness. That is, it is the combination of the additives of the present invention and the core/shell polymers that provides the ink with good ink permanence.

The ink-jet ink printing compositions of the present invention evidence superior smearfastness, as compared to prior art ink-jet ink compositions.

EXAMPLES

In the following examples, most of the monomers used were commercially available. The purity of such monomers is that found in normal commercial practice. Only the poly(ethylene glycol) methyl ether acrylate monomers of different molecular weights were prepared from the corresponding alcohol with acryloyl chloride in the presence of triethylamine by standard esterification process. Other monomers can be prepared by following conventional and well-known procedures of typical organic reactions.

Example 1

(Hexyl Acrylate)$_{10}$ (Methyl Methacrylate)$_{30}$ (Vinylpyrrolidone)$_{59}$ (D1)$_1$ Synthesis of core-shell polymer with hexyl acrylate (A), methyl methacrylate (MMA) (B), vinylpyrrolidone (C), and UV stabilizer (D1) (D) in the ratio of 10, 30, 59, and 1% by weight, respectively:

Hexyl acrylate (8 g), MMA (24 g), vinylpyrrolidone (47.2 g) and UV stabilizer D1(0.8 g) were mixed with BRIJ 92 (0.8 g), SOLSPERSE 27,000 (0.82 g), and isooctylmercaptopropionate (0.8 g) in water (12 g) to form an emulsion. The emulsion was saturated with nitrogen. Then the emulsion was added over a period of 1 hour to a solution of potassium persulfate (1.71 g) in water (703.09 g) at 80° C. The reaction mixture was maintained at 80° C. for 2.5 hour. The reaction mixture was then cooled to obtain the title polymer dispersed in water. The average particle size of the polymer solution was found to be 250 nm and the glass transition temperature ($T_g$) of the polymer obtained was 65° C.

Example 2

(Hexyl Acrylate)$_{30}$ (Methyl Methacrylate)$_{40}$ (Acrylamide)$_{30}$

Synthesis of core-shell polymer derived from hexyl acrylate (A), MMA (B), and acrylamide (E) in the ratio of 30, 40, and 30% by weight, respectively:

The monomers, hexyl acrylate (3 g), MMA (4 g), and acrylamide (3 g) were mixed in water (7 g) containing BRIJ 92 (0.22 g), Aerosol DPOS 45 (0.22 g), and isooctylmercaptopropionate (0.22 g) to form an emulsion. The emulsion was saturated with nitrogen and added dropwise to a solution of potassium persulfate (0.2 g) in water (82.14 g) at 100° C. Heating was continued for a period of 4 hours and cooled to obtain the title core-shell polymer. The average particle size of the polymer solution was found to be 200 nm and the glass transition temperature ($T_g$) of the polymer obtained was −10° and +125° C.

Examples 4–6

In the above Examples 1 to 3, the water-soluble components, such as vinylpyrrolidone (C), were replaced by poly(ethylene glycol) methyl ether acrylate (C) of molecular weight 404 (PEG-Ac(404)) in the corresponding amount to obtain core-shell polymer containing PEG-Ac(404). The resulting polymers and their average particle sizes and glass transition temperatures are given in Table II below.

TABLE II

Results of Examples 4–6.

| Polymer | Particle Size, nm | $T_g$, °C. |
|---|---|---|
| (hexyl acrylate)$_{10}$(methyl methacrylate)$_{30}$(PEG-Ac(404))$_{59}$(dl)$_1$-Ex. 4 | 150 | −10 |
| (hexyl acrylate)$_{30}$(methyl methacrylate)$_{40}$(PEG-Ac(404))$_{30}$-Ex. 5 | 180 | 0 |
| (lauryl methacrylate)$_{10}$(methyl methacrylate)$_{20}$ (PEG-Ac(404))$_{67}$(dl)$_1$(sodium styrene sulfonate)$_3$ | 150 | −10 |

Example 7

(Butyl Acrylate)$_{20}$ (Methyl Methacrylate)$_{80}$/ Surfactant (2 wt %)

Synthesis of polymer derived from butyl acrylate (A) and MMA (B) in the ratio of 20 and 80% by weight, respectively:

Butyl acrylate (4 g) and methyl methacrylate (16 g) were mixed with BRIJ 92 (0.2 g), SOLSPERSE 27,000 (0.2 g), and isooctylmercaptopropionate (0.2 g). An emulsion was prepared by adding water (2.0 g) to the above monomer mixture. The emulsion was saturated with nitrogen and added dropwise to a solution of potassium persulfate (0.4 g) in water (177 g) at 75° C. The reaction mixture was maintained at the same temperature for another 2 hr to obtain the title polymer/surfactant system dispersed in water. The average particle size of the polymer solution was found to be 165 nm and the glass transition temperature ($T_g$) of the polymer obtained was 63° C.

Examples 8–11

Comparison Examples 1–2

Testing of the physical properties of several durable, film-forming, water-dispersive polymers was performed and compared to prior art polymers. The tests involved a film-forming test, a water-dispersive stability test, and a measurement of the glass transition temperature, $T_g$.

(1) Film Forming Test.

The core/shell polymer of the invention was cast on a glass substrate and allowed to dry at ambient conditions for several hours. As the film-forming process occured, the milky color of the polymer solution gradually turned into a transparent film.

The formed film (on glass substrate) was soaked in water mixed with different solvents liquid additives (40% versus water) for 24 hrs and the weight loss was measured. The samples with the least weight loss samples are indicative of the most durable film.

(2) Water-Dispersive Stability Test.

The polymer emulsion was subjected to a centrifugation set at 4,000 rpm for 30 minutes. This is repeated twice. The amount of accumulation after centrifugation is an indication of the dispersion stability, with a higher amount of accumulation indicating less dispersion stability.

(3) Measurement of $T_g$.

The glass transition temperature was measured by Differential Scanning Calorimetry, using a DSC available from duPont de Nemours Company as Model 2.0.

The data accumulated from the foregoing tests are illustrated in the following Table III:

TABLE III

Results of Tests.

| Polymer | Solvent additives/ Weight loss (%) | Centrifugation Accumulation | $T_g$ (° C.) |
|---|---|---|---|
| (HA)$_{40}$(MMA)$_{40}$(PEGAc(404))$_{20}$- Ex. 8 | Ethyl acetate, 0.05% | <0.5% | −10 |
| (octadecyl acrylate)$_{40}$(methyl methacrylate)$_{40}$(poly(ethylene glycol) methyl ether acrylate, mw = 404)$_{20}$- Ex. 9 | Ethyl acetate, 0.05% | <0.1% | −10 |
| (acryloxypropylmethyldimethoxy-silane)$_{30}$(methyl methacrylate)$_{60}$ poly(ethylene glycol)methyl ether acrylate, mw = 404)$_{20}$-Ex. 10 | Ethyl acetate, 0.02% | <0.1% | 15 |
| (hexyl acrylate)$_{40}$(maleimide)$_{40}$ poly(ethylene glycol)methyl ether acrylate, mw = 404)$_{20}$-Ex. 11 | Ethyl acetate 0% | <0.01% | 60 |
| Comparison Example 1: (Styrene)$_{40}$(Acrylic Acid)$_{60}$ | Ethyl acetate 80% | 30% | 100 |
| Comparison Example 2: Acrylic acid polymer | 100% | Soluble | 106 |

Example 12

Comparison Examples 3–4

Commercially available Cabot pigment plus polymer plus penetrating humectant plus+ non-penetrating humectant:

Example 12

In an 250 cm$^3$ glass jar were added 5.0 g of carbon black (Vulcan XR-72), 25.0 g of a polymer of the invention comprising $(HA)_{30}(MMA)_{40}(PEGAc(404))_{30}$ (10 wt % solid), 10 g diethylene glycol (as non-penetrating humectant), 10 g N-methyl pyrrolidone (NMP, as penetrating humectant), 0.02 g of fluoro surfactant (Fluorad 99; 3M Products). The components were milled together by a paint shaker using 2 mm zirconium beads for 2 hrs. After being milled, the system was diluted with water to achieve a final ink solution of 5 wt % solid. The Zr beads were removed by 200 mesh filtering. The ink solution was centrifuged to eliminate agglomerated solids and the like and refiltered again through a 5 µm glass filter. This solution was then ready for print testing.

In order to perform the print test, the ink was filled into the black ink cartridge of a Hewlett-Packard Company DeskJet printer prototype product and printed with a frequency of 20 Kz.

The optical density (OD) of the print was measured by Mac Beth densitometer.

The decap characteristic of the pen was characterized as the number of the streak lines appearing at the right hand side of a black solid band. As the pen prints right-to-left in the printer, this is an indication of the startup performance of the pen—how long it takes the dried nozzles to come back to full nozzle health.

The stability of the ink was judged by measuring the changing of the particle size after the temperature cycle (T-cycle) between 70° C. and −70° C.

The particle size measurement is carried out by a Nikon particle sizer.

The kogation effect is a phenomenon in which the pen cannot perform due to the deterioration of the firing resistor in the ink chamber due to a buildup of residue. So the kogation, generally, terminates the life of the pen. The kogation was measured by number of prints exhibiting unchanged print quality (PQ) diring continuous printing process of 100 pages. The higher the number, the lower the kogation effect.

The smearfastness was measured by the background optical density (in mOD) when a neighbor image area is wiped twice with a highlighter pen.

The waterfastness was measured by the background optical density (in mOD) when a water drip runs across an image area.

Comparison Example 3

Example 12 was repeated, except the polymer was replaced by poly(ethylene glycol) having molecular weight in the range of 5,000.

Comparison Example 4

Example 12 was repeated, except the polymer was replaced by 98% hydrolyzed polyvinyl alcohol, average molecular weight=4,000.

The print tests results for Examples 12 and Comparison Examples 3 and 4 are summarized in Table IV.

TABLE IV

Results of Example 12 and Comparison Examples 3–4.

| Example | Optical density (OD) | Decap (lines/cm) | Particle size change after T-cycle | # of prints before kogation | Smear fastness (mOD) | Water fastness (mOD) |
|---|---|---|---|---|---|---|
| 12 | 1.45 | 1.0 | +/−3 nm | 100 | 35 | 0 |
| Comp. 3 | 1.40 | 1.0 | +/−3 nm | 100 | 600 | 400 |
| Comp. 4 | 1.45 | 3.0 | +/−5 nm | 40 | 600 | 420 |

Example 13

Example 12 was repeated, except that 1.28 g of dimethylaminopronanol (DMAMP) was added into the ink. It resulted in an increased OD of 1.55 and a decreased decel of 0 line/cm; the number of prints before kogation was 130. Actually, after this, the ink in the cartridge was totally consumed. Thus, the addition of DMAMP tends to improve the printability over the ink which does not contain DMAMP.

Example 14

Comparative Example 3 was repeated with 1.28 g of DMAMP additive, which gave rise to an increased OD up to 1.52 over the OD of 1.4 of the ink without the additive.

Examples 15–17

Example 13 was repeated, except that dimethylaminopronanol (DMAMP) was replaced respectively by 2-(2-amininoethoxy) ethanol (AEE, Aldrich Chemical), and 2-amino-1-butanol (Aldrich Chemical), Zoldine ZT-55 (Angus Chemical). The results of Examples 15-17 are listed in Table V, together with Examples 12 and 13.

TABLE V

Test Results of Examples 12–13 and 15–17.

| Example | Optical density (OD) | Decels (lines/cm) | Particle size change after T-cycles | # of prints before kogation | Smear fastness (mOD) | Water-fastness (mOD) |
|---|---|---|---|---|---|---|
| 12 | 1.45 | 1.0 | +/−3 nm | 100 | 35 | 0 |
| 13 (DMAMP additive) | 1.55 | 0.0 | +/−1 nm | 120 | 30 | 0 |
| 15(AEE additive) | 1.52 | 0.0 | +/−1 nm | 125 | 25 | 0 |
| 16(2-amino-1-butanol) | 1.57 | 0.0 | +/−1 nm | 125 | 25 | 0 |

TABLE V-continued

Test Results of Examples 12–13 and 15–17.

| Example | Optical density (OD) | Decels (lines/cm) | Particle size change after T-cycles | # of prints before kogation | Smear fastness (mOD) | Water-fastness (mOD) |
|---|---|---|---|---|---|---|
| 17(Zoldine ZT-55) | 1.55 | 0.0 | +/−1 nm | 125 | 25 | 0 |

Comparison Example 5

In an 250 cm$^3$ glass jar were added 13.44 g of magenta colorant QFD1180 (Sun Chemical), 25.0 g of polymer of the invention comprising (styrene)$_{30}$ (ethylhexylacrylate)$_{40}$ (vinyl pyrrolidone)$_{30}$ (10% solid), 10 g diethylene glycol (as nonpenetrating humectant), 10 g N-methyl pyrrolidone (NMP, as penetrating humectant), and 0.02 g of fluoro surfactant (Fluorad 99; 3M Products). The components were milled together by a paint shaker using 2 mm zirconium beads for 2 hrs. After being milled and the system was diluted with water to achieve a final ink solution of 5 wt %. The Zr beads were removed by 200 mesh filtering. The ink solution was centrifuged to eliminate agglomeration solids and the like and refiltered again through a 5 μm glass filter. This solution was then ready for print test. In order to perform the print test, the ink was loaded into the color cartridge of a Hewlett-Packard Company Desk-jet printer prototype product and printed with a frequency of 20 KHz. The other tests, specifically, OD, decel, T-cycle, particle size measurement, kogation, smear fastness and water fastness, were carried out by the same method described in Example 12.

Comparison Examples 6 and 7

Comparison Example 5 was repeated, except that the magenta colorant was replaced respectively by 9.96 g of cyan colorant BCD6105 (50.2% solid, Sun Chemical) and by 11.63 g of yellow colorant YHD (43% solid, Sun Chemical).

Examples 18–20

Comparison Examples 5–7 were repeated, except that 1.28 g of amino alcohol additive DMAMP (Aldrich Chemical) was added in each color ink sample respectively.

The test results of Examples 18–20 and Comparative Examples 5–7 are listed in Table VI.

TABLE VI

Test Results of Examples 18–20 and Comparison Examples 5–7.

| Example | Optical density (OD) | Decels (lines/cm) | Particle size change after T-cycles | # of prints before kogation | Smear fastness (mOD) | Water-fastness (mOD) |
|---|---|---|---|---|---|---|
| Comp Ex 5 | 1.25 | 10.0 | +/−50 nm | 15 | 40 | 5 |
| Ex 18 | 1.37 | 2.0 | +/−20 nm | 120 | 35 | 0 |
| Comp Ex 6 | 1.28 | 15.0 | +/−40 nm | 50 | 40 | 5 |
| Ex 19 | 1.42 | 1.0 | +/−10 nm | 120 | 30 | 0 |
| Comp Ex 7 | 1.0 | 10.0 | +/−40 mn | 10 | 50 | 8 |
| Ex 20 | 1.38 | 1.0 | +/−5 nm | 125 | 30 | 0 |

Comparison Example 8

Comparison Example 5 was repeated, except that:
(a) Magenta colorant QFD1180 was replaced by 5 g of Orasol Pink 5BLG (Ciba-Geigy); and
(b) Diethylene glycol, NMP, and fluoro surfactant system were replaced by 45.6 g of phenoxy ethanol and 11.4 g of xylene sulfonate. This type of organic vehicle can form a microemulsion with water.

Example 21

Comparison Example 8 was repeated, except that 1.28 g of DMAMP(Aldrich) was added into the ink.

The results for Comparison Example 8 and Example 21 are listed in Table VII.

TABLE VII

Test Results of Comparison Example 8 and Example 21.

| Example | Optical density (OD) | Decels (lines/cm) | Particle size change after T-cycles | # of prints before kogation | Smear fastness (mOD) | Water-fastness (mOD) |
|---|---|---|---|---|---|---|
| Comp Ex 8 | 1.1 | 20.0 | +/−60 nm | 5 | 50 | 10 |
| Ex 21 (micro emulsion) | 1.4 | 0.0 | +/−5 nm | 100 | 35 | 0 |

Comparison Example 9

Comparison Example 5 was repeated, except that magenta pigment colorant was replaced by 2 g of cationic dye Rhodamine 123 hydrate (Aldrich Chemical).

Example 22

Comparison Example 9 was repeated, except that 0.5 g of succinic acid was added.

Comparison Example 10

Comparison Example 5 was repeated, except that the magenta pigment colorant was replaced by 5 g of quartemary ammonium salt carbon black pigment IJX55 (Cabot).

Example 23

Comparison Example 10 was repeated, except that 1 g of sulfosuccinic acid was added.

The results for Examples 22 and 23 and Comparison Examples 9 and 10 are listed in Table VIII.

TABLE VIII

Test Results of Examples 22–23 and Comparison Examples 9–10.

| Example | Optical density (OD) | Decels (lines/cm) | Particle size change after T-cycles | # of prints before ko-gation | Smear fastness (mOD) | Water-fastness (mOD) |
|---|---|---|---|---|---|---|
| Comp Ex 9 (cationic dye) | 1.1 | 10.0 | +/−3 nm | 5 | 55 | 10 |
| Ex 22 (cationic dye + acidic additives) | 1.37 | 1.0 | +/−3 nm | 100 | 35 | 5 |
| Comp Ex 10 (cationic pigment) | 1.2 | 5.0 | +/−15 nm | 5 | 45 | 8 |
| Ex 23 (cationic pigment + acidic additives | 1.5 | 1.0 | +/−3 nm | 100 | 30 | 0 |

Comparison Example 11

Example 12 was repeated, except that Vulcan XR-72 was replaced by anionic carbon black pigment Cabojet 300 (Cabot).

Example 24

Comparison Example 11 was repeated, except that 1 g of polyacrylic acid derivative Disperbyk 181 (BYK-Chemie) (solid) was added.

Example 25

Comparison Example 11 was repeated, except that 1 g of polyacrylic acid derivative Disperbyk 181(BYK-Chemie) (solid) and 1.28 g of DMAMP were added together into the ink.

The results of Comparison Example 11 and Examples 24–25 are listed in Table IX.

TABLE IX

Test Results for Comparison Example 11 and Examples 24–25.

| Example | Optical density (OD) | Decals (lines/cm) | Particle size change after T-cycle | # of prints before ko-gation | Smear fastness (mOD) | Water fastness (mOD) |
|---|---|---|---|---|---|---|
| Comp Ex 11 | 1.2 | 5.0 | +/−3 nm | 20 | 100 | 25 |
| Ex 24 | 1.5 | 1.0 | +/−5 nm | 70 | 50 | 20 |
| Ex 25 | 1.5 | 0.0 | +/−3 nm | 130 | 25 | 0 |

Examples 26–29

Example 25 was repeated, except that Disperbyk 181 (BYK Chemie) as polymeric acid additive was replaced with Disperbyk 190 (BYK Chemie), BYK 380 (BYK Chemie), Neocryl BTS20 (Zeneca), or BT175 (Zeneca). The results are listed in Table X.

TABLE X

Test Results for Examples 26–29.

| Example | Optical density (OD) | Decels (lines/cm) | Particle size change after T-cycles | # of prints before ko-gation | Smear fastness (mOD) | Water-fastness (mOD) |
|---|---|---|---|---|---|---|
| 26 | 1.35 | 2.0 | +/−10 nm | 100 | 73 | 20 |
| 27 | 1.36 | 2.0 | +/−10 nm | 100 | 60 | 20 |

TABLE X-continued

Test Results for Examples 26–29.

| Example | Optical density (OD) | Decels (lines/cm) | Particle size change after T-cycles | # of prints before kogation | Smear fastness (mOD) | Water-fastness (mOD) |
|---|---|---|---|---|---|---|
| 28 | 1.42 | 1.0 | +/−5 nm | 100 | 65 | 20 |
| 29 | 1.52 | 1.0 | +/−5 nm | 100 | 70 | 15 |

Example 30

Example 25 was repeated, except that 0.5 g of polyethylene imine ethoxylated Cat. #30,618-5) was additionally added. The result is listed in Table XI. The results from Example 25 are also compared in this table.

TABLE XI

Test Results of Examples 25 and 30.

| Example | Optical density (OD) | Decels (lines/cm) | Particle size change after T-cycles | # of prints before kogation | Smear fastness (mOD) | Water-fastness (mOD) |
|---|---|---|---|---|---|---|
| 30 | 1.55 | 0.0 | +/−3 nm | 130 | 20 | 0 |
| 25 | 1.5 | 0.0 | +/−3 mm | 130 | 25 | 0 |

It will be seen that this Example 30 shows farther improvement of print properties when an polymeric acid and polyamine additive were added together into the

Examples 31–33

Example 30 was repeated, except that the polyethylene imine ethoxylated was replaced by piperazine (Aldrich Cat. #P4,5907), ethylenediamine (Aldrich Cat. #39,108-5), 2-piperidinemethanol (Aldrich Cat. #15,522-5), respectively. The results are listed in Table XII.

TABLE XII

Test Results for Examples 31–33.

| Example | Optical density (OD) | Decels (lines/cm) | Particle size change after T-cycles | # of prints before kogation | Smear fastness (mOD) | Water-fastness (mOD) |
|---|---|---|---|---|---|---|
| 30 | 1.55 | 0.0 | +/−3 nm | 130 | 15 | 0 |
| 31 | 1.55 | 0.0 | +/−3 mm | 130 | 15 | 0 |
| 32 | 1.56 | 0.0 | +/−3 mm | 130 | 20 | 0 |
| 33 | 1.534 | 0.0 | +/−3 nm | 130 | 20 | 0 |

Comparison Example 12

Comparison Example 11 was repeated, except that no binder was added.

Comparison Example 13

Comparison Example 11 was repeated, except that the total pigment/binder ratio was 1:2.

Example 34

Comparison Example 13 was repeated, except that 1 g of Neocryl BT520 and 0.2 g of DMAMP were added.

The test results for Comparison Examples 12 and 13 and for Example 34 are listed in Table XIII.

TABLE XIII

Test Results for Comparison Examples 12 and 13 and Example 34.

| Example | Optical Density (OD) | Decels (lines/cm) | Particle size change after T-cycles | # of prints before kogation | Smear fastness (mOD) | Water fastness (mOD) |
|---|---|---|---|---|---|---|
| Comp Ex 12 | 1.55 | 0.0 | +/−3 nm | 70 | 400 | 100 |
| Comp Ex 13 | Can't print | Every where | +/−100 nm | Can't test | Can't test | Can't test |
| Ex 34 | 1.56 | 0.0 | +/−3 nm | 100 | 10 | 0 |

The foregoing results show the superiority of an ink containing the additive of the invention as compared to inks that do not contain the additive of the invention. Specifically, kogation is reduced and smear-fastness and water-fastness are considerably improved, as are optical density and decel.

Thus, there has been disclosed ink-jet ink printing compositions having superior smearfastness. It will be appreciated by those skilled in the art that various changes and modifications of an obvious nature may be made, and all such changes and modifications are considered to fall within the scope of the invention.

What is claimed is:

1. An ink-jet printing ink composition comprising a vehicle and a colorant, wherein said composition further includes at least one core/shell polymeric binder to increase smearfastness of said composition and an additive, said core/shell polymeric binder having a formula given by

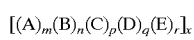

wherein A, B, C, D, and E are moieties as follows:

A=at least one hydrophobic component contributing to improved durable, film-forming properties selected from moieties which, when homopolymerized to a solid state, have a glass transition temperature ($T_g$) in the range between −150° and +25° C.;

B=at least one hydrophobic and solvent barrier moiety used to adjust the $T_g$ of the hydrophobic component of said polymer which, when homopolymerized to a solid state, has a $T_g$ greater than 25° C.;

C=at least one hydrophilic component comprising a water-soluble monomer;

D=at least one UV absorber;

E=at least one moiety having at least one highly polar functional group;

m=10 to 30 wt %;

n=40 to 90 wt %;

p=0 to 30 wt %;

q=0 to 50 wt %;

r=0 to 40 wt %;

m+n+p+q+r=100 wt %; and x=1 to 100,000, wherein said polymer has either hydrophobic and hydrophilic moieties or has only hydrophobic moieties and is associated with said surfactant to form a polymer/surfactant system, said polymer or polymer/surfactant system capable of forming a film from water, which, upon dehydration, is essentially resistant to water, said polymer having a $T_g$ within the range of about −25° to +110° C., said additive consisting essentially of a water-soluble or water-dispersible [amine, polyamine, polyalcohol,] amine alcohol, [polyester, or an organic acid,] said amine alcohol having a formula given by

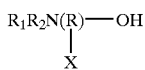     (II)

where $R_1$ and $R_2$ are independently selected from the group consisting of hydrogen, alkyl, alkoxy, aryl, and phenoxy, R is alkyl, X is hydrogen, alkyl, aryl, —OH, —COOH, and —CHO.

2. The ink-jet ink of claim 1 wherein said polymeric binder has a formula given by

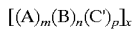

wherein

A=at least one hydrophobic component contributing to improved durable, film-forming properties selected from moieties which, when homopolymerized to a solid state, have a glass transition temperature ($T_g$) less than 25° C.;

B=at least one hydrophobic and solvent barrier moiety used to adjust the $T_g$ of the hydrophobic component of said polymer which, when homopolymerized to a solid state, has a $T_g$ greater than 25° C.;

C'=at least one hydrophilic component comprising a water-soluble monomer that is either ionic or non-ionic;

m>40 wt %;

n<30 wt %; and p<30 wt % and wherein in said amine alcohol, X is hydrogen.

3. The ink-jet ink of claim 1 wherein said A moiety is

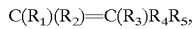

where $R_1$ and $R_2$ are independently hydrogen, halogen, alkyl, aryl, or substituted alkyl or aryl, or vinyl butyral, $R_3$ is hydrogen, halogen, saturated or unsaturated alkyl, alkoxy, aryl, or substituted alkyl, alkoxy, or aryl, $R_4$ is direct bond, O, CO, NH, halogen, saturated or unsaturated alkyl, aryl, or substituted alkyl, aryl, or CN, $R_5$ is absent (if $R_4$ is alkyl, aryl, or substituted alkyl or aryl), direct bond, hydrogen, NH, O, alkyl, alkylene, aryl, or substituted alkyl, alkylene, or aryl, and $R_6$ is absent (if $R_4$ is alkyl, aryl, or substituted alkyl or aryl or if $R_5$ is hydrogen, alkyl, aryl, or substituted alkyl or aryl), $NH_2$, saturated or unsaturated alkyl, alkoxy, aryl, aroxy, or substituted alkyl, or aryl, and where said alkyl, alkylene, aryl, alkoxy, and aroxy each contain more than 1 carbon atom and less than 40 carbon atoms.

4. The ink-jet ink of claim 3, wherein said A moiety is selected from the group consisting of ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicycopentyl ether acrylate; vinyl ethyl ketone; vinyl propyl ketone; vinyl hexyl ketone; vinyl octyl ketone; vinyl butyl ketone; cyclohexyl acrylate; 3-methacryloxypropyldimethylmethoxysilane; 3-methacryloxypropylmethyldimethoxysilane; 3-methacryloxypropylpentamethyldisiloxane; 3-methacryloxypropyltris(trimethylsiloxy)silane; 3-acryloxypropyldimethylmethoxysilane; acryloxypropylmethyldimethoxysilane, trifluoromethyl styrene, trifluoromethyl acrylate, trifluoromethyl methacrylate, tetrafluoropropyl acrylate, tetrafluoropropyl methacrylate, heptafluorobutyl methacrylate, iso-butyl acrylate, iso-butyl methacrylate, 2-ethylhexyl acrylate, 2-ethylhexyl methacrylate, iso-octyl acrylate, iso-octyl methacrylate, N,N-dihexyl acrylamide, N,N-dioctyl acrylamide, aminoethyl acrylate; aminoethyl methacrylate; aminoethyl butacrylate; aminoethylphenyl acrylate; aminopropyl acrylate; aminopropyl methacrylare; amino- iso-propyl acrylate; aminoisopropyl methacrylate; aminobutyl acrylate; aminobutyl methacrylate; aminohexyl acrylate; aminohexyl methacrylate; aminooctadecyl methacrylate; aminooctadecyl acrylate; aminolauryl methacrylate; aminolauryl acrylate; N,N-dimethyl-aminoethyl acrylate; N,N-dimethylaminoethyl methacrylate; N,N-diethylaminoethyl acrylate; N,N-diethylaminoethyl methacrylate; piperidino-N-ethyl acrylate, vinyl propionate; vinyl acetate; vinyl butyrate; vinyl butyl ether; and vinyl propyl ether.

5. The ink-jet ink of claim 1 wherein said B moiety is

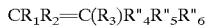

where $R_3$ and $R_2$ are independently selected from hydrogen, halogen, and vinyl butyral, $R_3$ is hydrogen, halogen, alkyl, alkoxy, alkylene, aryl, or substituted alkyl, alkoxy, alkylene, or aryl, R"$_4$ is direct bond, O, CO, N, NO$_2$, halogen, alkyl, alkylene, aryl, or substituted alkyl, alkylene, aryl, R"$_5$ is hydrogen, N, O, alkyl, alkylene, aryl, or substituted alkyl, alkylene, or aryl, and R"$_6$ is alkyl, alkoxy, alkylene, aryl, aroxy, or substituted alkyl, alkylene, or aryl, and where said alkyl, alkylene, aryl, alkoxy, and aroxy each contain from 1 to 40 carbon atoms, where $R_1$ and $R_2$ and $R_2$ and $R_3$ can each form a ring, and where $R_4$ and $R_5$ can form a ring through nitrogen or oxygen.

6. The ink-jet ink of claim 5 wherein said B moiety is selected from the group consisting of ethylene; styrene; vinyl carbazole; vinyl naphthalalene; vinyl anthracene; vinyl pyrene; methyl methacrylate; methyl acrylate; alpha-methylstyrene; dimethylstyrene; methylstyrene; vinylbiphenyl; glycidyl acrylate; glycidyl methacrylate; glycidyl propylene; 2-methyl-2-vinyl oxirane; vinyl pyrridine, aminoethyl acrylate, aminoethyl methacrylate, aminoethylphenyl acrylate, maleimide; N-phenyl maleimide; N-hexyl maleimide; N-vinyl-phthalimide; and N-vinyl maleimide.

7. The ink-jet ink of claim 2 wherein said C' moiety is selected from the group consisting of

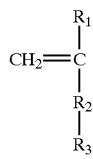
(a)

where $R_1$=H, halogen, alkyl, aryl, or substituted alkyl or aryl;

$R_2$=direct bond, O, CO, NH, or CONH;

$R_3$=OH, $(CH_2CH_2O)_yR_4$, $(CH_2CH(CH_3)O)_yR_4$, or $(CH_2CH(C_2H_5)O)_yR_4$, SH, $(CH_2CH_2S)_yR_4$, $(CH_2CH(CH_3)S)_yR_4$, or $(CH_2CH(C_2H_5)S)_yR_4$;

y=1 to 200; and $R_4$=alkyl, aryl, substituted alkyl or aryl;

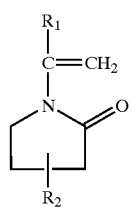
(b)

where $R_1$ and $R_2$ are independently selected from H, halogen, alkyl, aryl, and substituted alkyl and aryl, where said alkyl and aryl each contain from 2 to 40 carbon atoms;

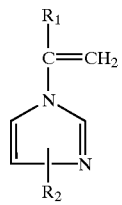
(c)

where $R_1$ and $R_2$ are independently selected from H, halogen, alkyl, aryl, and substituted alkyl and aryl;

(d)

where $R_1$=H, halogen, alkyl, aryl or substituted alkyl or aryl; and $R_2$ and $R_3$ are either independently selected from alkyl, aryl, and substituted alkyl and aryl or can form either an aliphatic ring or an aromatic ring;

$$CH(R_1)=C(R_2)R_3COOH \qquad (e)$$

where $R_1$=H, COOH, COOR$_4$;

$R_2$=H, halogen, alkyl, aryl, alkoxyl, substituted alkyl, aryl or alkoxyl;

$R_3$=direct bond, alkylene, arylene, or sustituted alkylene or arylene; and $R_4$=alkyl, aryl, or substituted alkyl or aryl;

$$CH_2=CHR_1NR_2R_3 \qquad (f)$$

where $R_1$=alkylene, arylene, substituted alkylene or arylene, or SO$_2$; and $R_2$ and $R_3$ are either independently selected from H, alkyl, aryl, and substituted alkyl, aryl and alkoxyl or form either an aliphatic or aromatic ring;

$$y(CH_2=CHR_1COO^-)M^{y+} \qquad (g)$$

where $R_1$=alkylene, arylene, substituted alkylene or arylene;

y=1 to 4; and $M^{y+}$=NH$_4^+$, Li$^+$, Na$^+$, K$^+$, Ca$^{2+}$, Mg$^{2+}$, Al$^{3+}$, Ti$^{4+}$, triethylammonium, diethylammonium, and pyrridinium;

$$z(CH_2=CHR_1N^+R_2R_3R_4)X^{z-} \qquad (h)$$

where $R_1$=alkylene, arylene, substituted alkylene or arylene, COO, or cyclic ring containing nitrogen;

$R_2$, $R_3$, and $R_4$ are independently selected from H, alkyl, aryl, alkoxyl, and substituted alkyl, aryl and alkoxyl;

z=1 to 4; and

X=halogen, BF$_4$, PF$_6$ ClO$_4$, SCN, CNO, CNS;

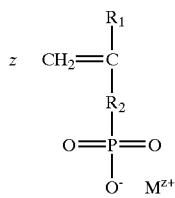

(i)

where $R_1$=H, alkyl, aryl, alkoxyl, substituted alkyl, aryl or alkoxyl;

$R_2$=direct bond, alkylene, arylene, or substituted alkylene or arylene;

z=1 to 4; and $M^{z+}$=$NH_4^+$, $Li^+$, $Na^+$, $K^+$, $Ca^{2+}$, $Mg^{2+}$, $Al^{3+}$, $Ti^{4+}$, triethylammonium, diethylmonium, and pyrridinium;

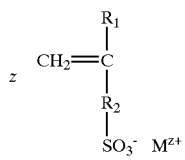

(j)

where $R_1$=H, alkyl, aryl, alkoxyl, or substituted alkyl, aryl or alkoxyl;

$R_2$=direct bond, $COOR_3$, arylene, alkylene, or —$CONHR_3$;

$R_3$=alkylene, arylene, or substituted alkylene or arylene, or fluoroalkylene;

z=1 to 4; and $M^{z+}$=$NH_4^+$, $Li^+$, $Na^+$, $K^+$, $Ca^{2+}$, $Mg^{2+}$, $Al^{3+}$, $Ti^{4+}$;

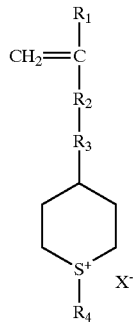

(k)

where $R_1$=—H, halogen, alkyl, or aryl;

$R_2$=>CO, —O—;

$R_3$=direct bond, >NH;

$R_4$=alkyl or aryl; and

X=Cl, Br, $BF_4$, $ClO_4$, I, or $NO_3$;

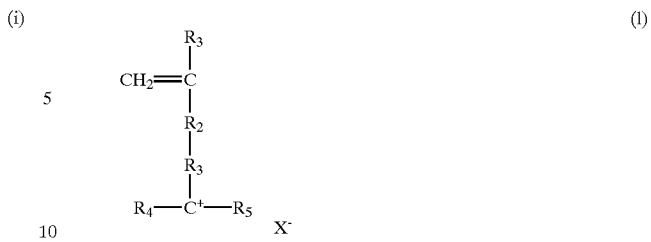

(l)

where $R_1$=—H, halogen, alkyl, or aryl;

$R_2$=>CO, —O—;

$R_3$=direct bond, >NH, alkylene, or arylene;

$R_4$ and $R_5$ are independently selected from alkyl or aryl; and

X=$SbF_5^-$; $FSO_3^-$;

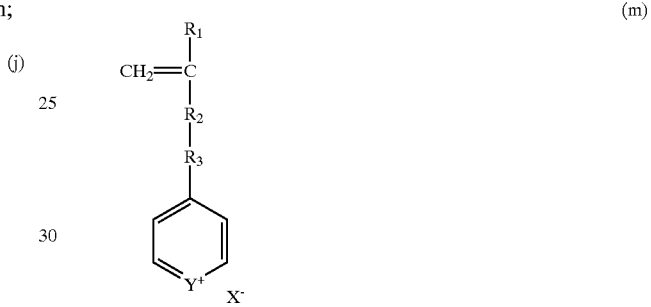

(m)

where

Y=O or S;

$R_1$=—H, halogen, alkyl, or aryl;

$R_2$=>CO, —O—;

$R_3$=direct bond, >NH, alkylene, or arylene;

X=Cl, Br, I, $ClO_4$, $BF_4$; and (n) a tetrazolium salt.

8. The ink-jet ink of claim 7 wherein said C' moiety is selected from the group consisting of poly(ethylene glycol) methyl ether acrylate of average molecular weight 404; poly(ethylene glycol) methyl ether methacrylate of average molecular weight 418; poly(ethylene glycol) methyl ether methacrylate of average molecular weight 2068; poly(ethylene glycol) methyl ether acrylate of average molecular weight 2054; polyvinyl alcohol; vinyl pyrrolidone, vinyl 4-methylpyrrolidone, vinyl 4-phenylpyrrolidone; vinyl imidazole, vinyl 4-methylimidazole, vinyl 4-phenylimidazole; acrylamide; methacrylamide; N,N-dimethyl acrylamide; N-methyl acrylamide; N-methyl methacrylamide; aryloxy piperidine; N,N-dimethyl acrylamide; acrylic acid; methacrylic acid; chloromethacrylic acid; maleic acid; allylamine; N,N-diethylallylamine; vinyl sulfonamide; sodium acrylate; sodium methacrylate; ammonium acrylate; ammonium methacrylate; acrylamidopropanetriethylammonium chloride; methacrylamidopropanetriethylammonium chloride; vinylpyridine hydrochloride; sodium vinyl phosphonate; sodium 1-methylvinylphosphonate; sodium vinyl sulfonate; sodium 1-methylvinylsulfonate; sodium styrenesulfonate; sodium acrylamidopropanesulfonate; sodium methacrylamidopropanesulfonate; and sodium vinyl morpholine sulfonate.

9. The ink-jet ink of claim 1 wherein said polymer is selected from the group consisting of (hexyl acrylate)$_{40}$ (methyl methacrylate)$_{40}$ (poly(ethylene glycol) methyl ether acrylate, mw=404)$_{20}$; (hexyl acrylate)$_{30}$ (methyl methacrylate)$_{50}$ (poly(ethylene glycol) methyl ether acrylate, mw=404)$_{20}$; (hexyl acrylate)$_{20}$ (methyl methacrylate)$_{60}$ (poly(ethylene glycol) methyl ether acrylate, mw=404)$_{20}$; (hexyl acrylate)$_{40}$ (methyl methacrylate)$_{40}$ (poly(ethylene glycol) methyl ether acrylate, mw=2054)$_{20}$; (hexyl acrylate)$_{30}$ (methyl methacrylate)$_{50}$ (poly(ethylene glycol) methyl ether acrylate, mw=2054)$_{20}$; (hexyl acrylate)$_{20}$ (methyl methacrylate)$_{60}$ (poly(ethylene glycol) methyl ether acrylate, mw=2054)$_{20}$; (hexyl acrylate)$_{40}$ (methyl methacrylate)$_{40}$ (poly(ethylene glycol) methyl ether acrylate, mw=218)$_{20}$; (hexyl acrylate)$_{30}$ (methyl methacrylate)$_{50}$ (poly(ethylene glycol) methyl ether acrylate, mw=218)$_{20}$; (hexyl acrylate)$_{20}$ (methyl methacrylate)$_{60}$ (poly(ethylene glycol) methyl ether acrylate, mw=218)$_{20}$; (ethyl acrylate)$_{40}$ (methyl methacrylate)$_{40}$ (poly(ethylene glycol) methyl ether acrylate, mw=404)$_{20}$; (propyl acrylate)$_{40}$ (methyl methacrylate)$_{40}$ (poly(ethylene glycol) methyl ether acrylate, mw=404)$_{20}$; (butyl acrylate)$_{40}$ (methyl methacrylate)$_{40}$ (poly(ethylene glycol) methyl ether acrylate, mw=404)$_{20}$; (octadecyl acrylate)$_{40}$ (methyl methacrylate)$_{40}$ (poly(ethylene glycol) methyl ether acrylate, mw=404)$_{20}$; (lauryl methacrylate)$_{40}$ (methyl methacrylate)$_{40}$ (poly(ethylene glycol) methyl ether acrylate, mw=404)$_{20}$; (octadecyl methacrylate)$_{40}$ (methyl methacrylate)$_{40}$ (poly(ethylene glycol) methyl ether acrylate, mw=404)$_{20}$; (hydroxyoctadecyl acrylate)$_{40}$ (methyl methacrylate)$_{40}$ (poly(ethylene glycol) methyl ether acrylate, mw=404)$_{20}$; (hydroxyethyl acrylate)$_{40}$ (methyl methacrylate)$_{40}$ (poly(ethylene glycol) methyl ether acrylate, mw=404)$_{20}$; (hydroxylauryl methacrylate)$_{40}$ (methyl methacrylate)$_{40}$ (poly(ethylene glycol) methyl ether acrylate, mw=404)$_{20}$; (phenethyl acrylate)$_{40}$ (methyl methacrylate)$_{40}$ (poly(ethylene glycol) methyl ether acrylate, mw=404)$_{20}$; (6-phenylhexyl acrylate)$_{40}$ (methyl methacrylate)$_{40}$ (poly(ethylene glycol) methyl ether acrylate, mw=404)$_{20}$; (cyclohexyl acrylate)$_{40}$ (methyl methacrylate)$_{40}$ (poly(ethylene glycol) methyl ether acrylate, mw=404)$_{20}$; (acryloxypropylmethyldimethoxysilane)$_{30}$ (methyl methacrylate)$_{50}$ (poly(ethylene glycol) methyl ether acrylate, mw=404)$_{20}$; (N,N-dihexyl acrylamide)$_{20}$ (methyl methacrylate)$_{60}$ (poly(ethylene glycol) methyl ether acrylate, mw=404)$_{20}$; (aminopropyl acrylate)$_{40}$ (methyl methacrylate)$_{40}$ (poly(ethylene glycol) methyl ether acrylate, mw=205$^4$)$_{20}$; (aminohexyl acrylate)$_{30}$ (methyl methacrylate)$_{50}$ (poly(ethylene glycol) methyl ether acrylate, mw=2054)$_{20}$; (aminolauryl methacrylate)$_{20}$ (methyl methacrylate)$_{60}$ poly(ethylene glycol) methyl ether acrylate, mw=2054)$_{20}$; (NN-dimethylaminoethyl acrylate)$_{40}$ (methyl methacrylate)$_{40}$ (poly(ethylene glycol) methyl ether acrylate, mw=218)$_{20}$; (vinyl acetate)$_{30}$ (methyl methacrylate)$_{50}$ (poly(ethylene glycol) methyl ether acrylate, mw=218)$_{20}$; (vinyl butyl ether)$_{20}$ (methyl methacrylate)$_{60}$ (poly(ethylene glycol) methyl ether acrylate, mw=218)$_{20}$; (hexyl acrylate)$_{40}$ (styrene)$_{40}$ (poly(ethylene glycol) methyl ether acrylate, mw=404)$_{20}$; (hexyl acrylate)$_{30}$ (dimethyl styrene)$_{50}$ (poly(ethylene glycol) methyl ether acrylate, mw=404)$_{20}$; (hexyl acrylate)$_{20}$ (trifluoromethyl styrene)$_{60}$ (poly(ethylene glycol) methyl ether acrylate, mw=404)$_{20}$; (hexyl acrylate)$_{40}$ (tetrafluoropropyl methacrylate)$_{40}$ (poly(ethylene glycol) methyl ether acrylate, mw=2054)$_{20}$; (hexyl acrylate)$_{30}$ (glycidyl methacrylate)$_{50}$ (poly(ethylene glycol) methyl ether acrylate, mw=2054)$_{20}$; (hexyl acrylate)$_{20}$ (glycidyl acrylate)$_{60}$ (poly(ethylene glycol) methyl ether acrylate, mw=2054)$_{20}$; (hexyl acrylate)$_{40}$ (maleimide)$_{40}$ (poly(ethylene glycol) methyl ether acrylate, mw=218)$_{20}$; (hexyl acrylate)$_{50}$ (n-hexyl maleimide)$_{30}$ (poly(ethylene glycol) methyl ether acrylate, mw=218)$_{20}$; (hexyl acrylate)$_{40}$ (n-vinyl maleimide)$_{40}$ (poly(ethylene glycol) methyl ether acrylate, mw=218)$_{20}$; (hexyl acrylate)$_{40}$ (methyl methacrylate)$_{40}$ (vinyl pyrrolidone)$_{20}$; (hexyl acrylate)$_{40}$ (methyl methacrylate)$_{40}$ (vinyl 4-methylpyrrolidone)$_{20}$; (hexyl acrylate)$_{40}$ (methyl methacrylate)$_{40}$ (vinyl imidazole)$_{20}$; (hexyl acrylate)$_{40}$ (methyl methacrylate)$_{40}$ (acrylamide)$_{20}$; (hexyl acrylate)$_{40}$ (methyl methacrylate)$_{40}$ (4-methyl acrylamide)$_{20}$; (hexyl acrylate)$_{50}$ (methyl methacrylate)$_{45}$ (poly(ethylene glycol) methyl ether acrylate, mw=404)$_{5}$; (hexyl acrylate)$_{50}$ (methyl methacrylate)$_{40}$ (poly(ethylene glycol) methyl ether acrylate, mw=404)$_{10}$; (hexyl acrylate)$_{50}$ (methyl methacrylate)$_{35}$ (poly(ethylene glycol) methyl ether acrylate, mw=404)$_{15}$.

10. The ink-jet ink of claim 1 wherein said polymer is selected from the group consisting of (hexyl acrylate)$_{40}$ (methyl methacrylate)$_{40}$ (acrylic acid)$_{20}$; (hexyl acrylate)$_{60}$ (methyl methacrylate)$_{20}$ (methacrylic acid)$_{20}$; (hexyl acrylate)$_{40}$ (methyl methacrylate)$_{40}$ (maleic acid)$_{20}$; (hexyl acrylate)$_{40}$ (methyl methacrylate)$_{40}$, (vinyl benzoic acid)$_{20}$; (hexyl acrylate)$_{40}$ (methyl methacrylate)$_{40}$ (vinyl sulfonamide)$_{20}$; (hexyl acrylate)$_{40}$ (methyl methacrylate)$_{40}$ (sodium acrylate)$_{20}$; (hexyl acrylate)$_{40}$ (methyl methacrylate)$_{40}$ (ammonium acrylate)$_{20}$; (hexyl acrylate)$_{40}$ (methyl methacrylate)$_{40}$ (ammonium methacrylate)$_{20}$; (ethyl acrylate)$_{40}$ (methyl methacrylate)$_{40}$ (acrylamidopropanetriethyl-ammonium chloride)$_{20}$; (propyl acrylate)$_{40}$ (methyl methacrylate)$_{40}$ (vinyl pyridine hydrochloride)$_{20}$; (butyl acrylate)$_{40}$ (methyl methacrylate)$_{40}$ (sodium vinyl phosphate)$_{20}$; (hexyl acrylate)$_{40}$ (methyl methacrylate)$_{40}$ (sodium styrene sulfonate)$_{20}$; and (methyl methacrylate)$_{32}$ (hexyl acrylate)$_{46}$ (poly(ethylene glycol) methyl ether acrylate, mw=404)$_{12}$ (acrylic acid)$_{10}$.

11. The ink-jet ink of claim 1 wherein said amine alcohol is selected from the group consisting of ethanolamine, dimethylaminopropanol, aminobutanol and derivatives thereof, dipropylaminopropane diol, amino propane diol, 2(2-ethyl-ethoxyamino ethanol), dimethylaminobutanol, 2-(diisopropylamino)ethanol, diisopropanolamine, hydroxyquinone, 3-(2-hydroxyethylamino)-5,5-dimethyl-2-cyclohexene-1-one, 3-(1-hydroxyethyl)aniline, 4-morpholineethanol, and 3-morpholino-1,2-propanediol.

12. The ink-jet ink of claim 1 wherein said colorant and said core/shell polymeric binder are present in a ratio within a range of about 10:1 to 1:10.

13. The ink-jet ink of claim 12 wherein said ratio is between about 5:1 and 1:5.

14. The ink-jet ink of claim 13 wherein said ratio is between about 3:1 and 1:3.

15. The ink-jet ink of claim 1 wherein said additive is present in said ink within a range of about 0.005 to 50 wt %.

16. The ink-jet ink of claim 1 wherein said ink comprises:

5 to 50 wt % water-miscible solvent;

0.5 to 10 wt % colorant;

0.1 to 10 wt % at least one said core/shell polymeric binder;

0.005 to 50 wt % at least one said additive; and water.

17. The ink-jet ink of claim 1 wherein said C moiety is

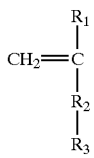

where

R$_1$=H, halogen, alkyl, aryl, or substituted alkyl or aryl;
R$_2$=direct bond, O, CO, NH, or CONH;
R$_3$=OH, (CH$_2$CH$_2$O)$_y$R$_4$, (CH$_2$CH(CH$_3$)O)$_y$R$_4$, (CH$_2$CH(C$_2$H$_5$)O)$_y$R$_4$, SH, (CH$_2$Ch$_2$S)$_y$R$_4$, (CH$_2$CH(CH$_3$)S)$_y$R$_4$, or (CH$_2$CH(C$_2$H$_5$)S)$_y$R$_4$;
y=1 to 200; and
R$_4$=alkyl, aryl, substituted alkyl or aryl.

18. The ink-jet ink of claim 17 wherein said C moiety is selected from the group consisting of poly(ethylene glycol) methyl ether acrylate of average molecular weight 404; poly(ethylene glycol) methyl ether methacrylate of average molecular weight 418; poly(ethylene glycol) methyl ether methacrylate of average molecular weight 2068; poly(ethylene glycol) methyl ether acrylate of average molecular weight 2054; and polyvinyl alcohol.

19. The ink-jet ink of claim 1 wherein said C moiety is

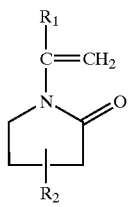

where R$_1$ and R$_2$ are independently selected from H, halogen, alkyl, aryl, and substituted alkyl and aryl, where said alkyl and aryl each contain from 2 to 40 carbon atoms.

20. The ink-jet ink of claim 19 wherein said C moiety is selected from the group consisting of vinyl pyrrolidone, vinyl 4-methylpyrrolidone, and vinyl 4-phenylpyrrolidone.

21. The ink-jet ink of claim 1 wherein said C moiety is

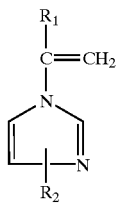

where R$_1$ and R$_2$ are independently selected from H, halogen, alkyl, aryl, and substituted alkyl and aryl.

22. The ink-jet ink of claim 21 wherein said C moiety is selected from the group consisting of vinyl imidazole, vinyl 4-methylimidazole, and vinyl 4-phenylimidazole.

23. The ink-jet ink of claim 1 wherein said C moiety is

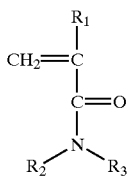

where

R$_1$=H, halogen, alkyl, aryl or substituted alkyl or aryl; and
R$_2$ and R$_3$ are either independently selected from alkyl, aryl, and substituted alkyl and aryl or can form either an aliphatic ring or an aromatic ring.

24. The ink-jet ink of claim 23 wherein said C moiety is selected from the group consisting of acrylamide; methacrylamide; N,N-dimethyl acrylamide; N-methyl acrylamide; N-methyl methacrylamide; aryloxy piperidine; and N,N-dimethyl acrylamide.

25. The ink-jet ink of claim 1 wherein said D moiety is selected from the group consisting of (11)

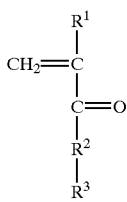

R$^1$ = H, Alkyl, aryl, substituted alkyl or aryl
R$^2$ = O or NH

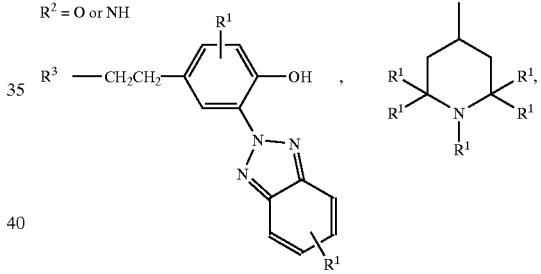

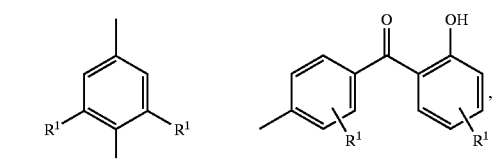

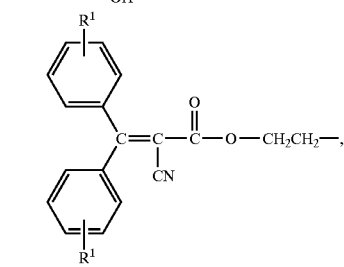

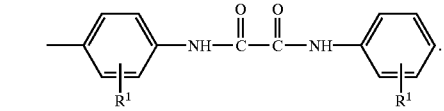

26. The ink-jet ink of claim 1 wherein said E moiety is

CH(R$_1$)=C(R$_2$)R$_3$COOH where

R₁=H, COOH, COOR₄;

R₂=H, halogen, alkyl, aryl, alkoxyl, substituted alkyl, aryl or alkoxyl;

R₃=direct bond, alkylene, arylene, or sustituted alkylene or arylene; and

R₄=alkyl, aryl, or substituted alkyl or aryl.

27. The ink-jet ink of claim 26 wherein said E moiety is selected from the group consisting of acrylic acid; methacrylic acid; chloromethacrylic acid; maleic acid; and vinyl benzoic acid.

28. The ink-jet ink of claim 1 wherein said E moiety is

$CH_2=CHR_1NR_2R_3$ where

R₁=alkylene, arylene, substituted alkylene or arylene, or SO₂; and

R₂ and R₃ are either independently selected from H, alkyl, aryl, and substituted alkyl, aryl and alkoxyl or form either an aliphatic or aromatic ring.

29. The ink-jet ink of claim 28 wherein said E moiety is selected from the group consisting of allylamine; N,N-diethylallyiamine; and vinyl sulfonamide.

30. The ink-jet ink of claim 1 wherein said E moiety is

$y(CH_2=CHR_1COO^-)M^{y+}$ where

R₁=alkylene, arylene, substituted alkylene or arylene;

y=1 to 4; and $M^{y+}=NH_4^+$, Li⁺, Na⁺, K⁺, Ca²⁺, Mg²⁺, Al³⁺, Ti⁴⁺, triethylammonium, diethylammonium, or pyrridinium.

31. The ink-jet ink of claim 30 wherein said E moiety is selected from the group consisting of sodium acrylate; sodium methacrylate; ammonium acrylate; and ammonium methacrylate.

32. The ink-jet-ink of claim 1 wherein said E moiety is

$z(CH_2=CHR_1N^+R_2R_3R_4)X^{z-}$ where

R₁=alkylene, arylene, substituted alkylene or arylene, COO, or cyclic ring containing nitrogen;

R₂, R₃, and R₄ are independently selected from H, alkyl, aryl, alkoxyl, and substituted alkyl, aryl and alkoxyl;

z=1 to 4; and

X=halogen, BF₄, PF₆, ClO₄, SCN, CNO, or CNS.

33. The ink-jet-ink of claim 32 wherein said E moiety is selected from the group consisting of acrylamidopropanetriethylammonium chloride; methacrylamidopropanetriethylammonium chloride; and vinylpyridine hydrochloride.

34. The ink-jet-ink of claim 1 wherein said E moiety is

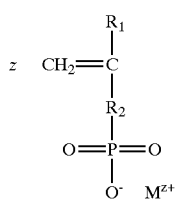

where

R₁=H, alkyl, aryl, alkoxyl, substituted alkyl, aryl or alkoxyl;

R₂=direct bond, alkylene, arylene, or substituted alkylene or arylene;

z=1 to 4; and $M^{z+}=NH_4^+$, Li⁺, Na⁺, K⁺, Ca²⁺, Mg²⁺, Al³⁺, Ti⁴⁺, triethylammonium, diethylammonium, or pyrridinium.

35. The ink-jet ink of claim 34 wherein said E moiety is selected from the group consisting of sodium vinyl phosphonate and sodium 1-methylvinylphosphonate.

36. The ink-jet-ink of claim 1 wherein said E moiety is

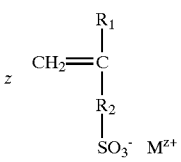

where

R₁=H, alkyl, aryl, alkoxyl, or substituted alkyl, aryl or alkoxyl;

R₂=direct bond, COOR₃, arylene, alkylene, or —CONHR₃,

R₃=alkylene, arylene, or substituted alkylene or arylene, or fluoroalkylene;

z=1 to 4; and $M^{z+}=NH_4^+$, Li⁺, Na⁺, K⁺, Ca²⁺, Mg²⁺, Al³⁺, or Ti⁴⁺.

37. The ink-jet of ink claim 36 wherein said E moiety is selected from the group consisting of sodium vinyl sulfonate; sodium 1-methylvinylsulfonate; sodium styrenesulfonate; sodium acrylamidopropanesulfonate; sodium methacrylamidopropanesulfonate; and sodium vinyl morpholine sulfonate.

38. The ink-jet ink of claim 1 wherein said E moiety is a sulfonium salt having the following structure:

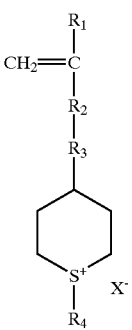

where

R₁=—H, halogen, alkyl, or aryl;

R₂=>CO, —O—;

R₃=direct bond, >NH;

R₄=alkyl or aryl; and

X=Cl, Br, BF₄, ClO₄, I, or NO₃.

39. The ink-jet ink of claim 1 wherein said E moiety is a carbonium salt having the following structure:

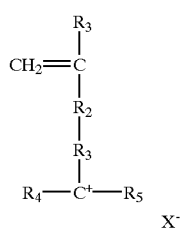

where

R₁=—H, halogen, alkyl, or aryl;

R₂=>CO or —O—;

R₃=direct bond, >NH, alkylene, or arylene;

R₄ and R₅ are independently selected from alkyl or aryl; and

X =SbF₅⁻ or FSO₃⁻.

40. The ink-jet ink of claim 1 wherein said E moiety is a pyrilinium salt or thiopyrrilinium salt having the following structure:

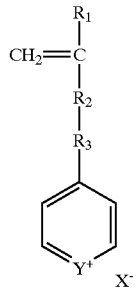

where

Y=O or S;

R₁=—H, halogen, alkyl, or aryl;

R₂=>CO or —O—;

R₃=direct bond, >NH, alkylene, or arylene;

X=Cl, Br, I, ClO₄, or BF₄.

41. The ink-jet ink of claim 1 wherein said E moiety is a tetrazolium salt.

42. The ink-jet ink of claim 1 wherein said surfactant is selected from the group consisting of anionic, cationic, non-ionic, and zwitterionic surfactants.

43. The ink-jet ink of claim 42 wherein said surfactant is selected from the group consisting of polyethylene oxide ethers; polypropylene oxide ethers; alkyl phenyl polyethylene oxides; acetylenic ethoxylated diols; polyethylene oxide esters; polyethylene oxide diesters; polyethylene oxide amines; protonated polyethylene oxide amines; polyethylene oxide amides; polypropylene oxide esters; polypropylene oxide diesters; polypropylene oxide amines; protonated polypropylene oxide amines; polypropylene oxide amides; dimethicone copolyols; quaternary ammonium compounds; sulfosuccinates; ethoxylates, amine oxides, and betaines.

44. The ink-jet ink of claim 42 wherein said surfactant is present within a range of about 0.001 to 30 wt %, and the balance said polymer.

* * * * *

UNITED STATES PATENT AND TRADEMARK OFFICE
CERTIFICATE OF CORRECTION

PATENT NO.   : 6,417,249 B1  
DATED        : July 9, 2002  
INVENTOR(S)  : Nguyen et al.

It is certified that error appears in the above-identified patent and that said Letters Patent is hereby corrected as shown below:

<u>Column 35,</u>  
Line 30, delete "[amine, polyamine, polyalcohol,]".  
Line 30, delete "[polyester,".  
Line 31, delete "or an organic acid,]"

<u>Column 41,</u>  
Line 51, delete "mw=$205^4$) $_{20}$;" and insert therefor -- mw=2054) $_{20}$; --.

Signed and Sealed this

Sixth Day of January, 2004

JAMES E. ROGAN  
*Director of the United States Patent and Trademark Office*